United States Patent [19]
Chatterjea et al.

[11] Patent Number: 5,937,897
[45] Date of Patent: Aug. 17, 1999

[54] HYDRAULIC MOTION CONTROL VALVE AND LEVER

[75] Inventors: Probir Kumar Chatterjea, Sleepy Hollow; Robert Charles Dunn, Green Oaks, both of Ill.

[73] Assignee: Kamatsu America International Company, Vernon Hills, Ill.

[21] Appl. No.: 09/179,001

[22] Filed: Oct. 26, 1998

Related U.S. Application Data

[62] Division of application No. 08/841,853, May 5, 1997, Pat. No. 5,868,230
[60] Provisional application No. 60/018,437, May 28, 1996.
[51] Int. Cl.$^6$ .............................. F16K 11/18; F16K 37/00
[52] U.S. Cl. ..................... 137/554; 137/556; 137/636.2; 137/636.3
[58] Field of Search ................................... 137/554, 556, 137/636.2, 636.3

[56] References Cited

U.S. PATENT DOCUMENTS

| | | |
|---|---|---|
| 3,496,796 | 2/1970 | Alpers et al. . |
| 3,918,496 | 11/1975 | Byers, Jr. . |
| 4,269,228 | 5/1981 | Salomatin ......................... 137/636.3 X |
| 4,404,991 | 9/1983 | Cullen . |
| 4,421,135 | 12/1983 | Harshman et al. . |
| 4,938,091 | 7/1990 | Waggoner et al. . |
| 5,184,646 | 2/1993 | Hori et al. . |
| 5,209,263 | 5/1993 | Hori . |
| 5,224,589 | 7/1993 | Karakama et al. . |

OTHER PUBLICATIONS

Komatsu Parts Manual for D–41 Tractor control linkage, three (3) sheets, (undated).
Caterpillar Tractor Co. "Supplement D6H And D7H Series II And D8N Tractors Differential Steering Control Supplement", four (4) sheets: cover page and pp. 12, 30, and 31, (undated).

Primary Examiner—Gerald A. Michalsky
Attorney, Agent, or Firm—Edward G. Fiorito

[57] ABSTRACT

The present invention provides a hydraulic motion control or pilot valve and lever assembly for controlling the transmission and steering of a work vehicle such as a crawler tractor, articulated wheel loader or like construction vehicle. The motion control valve and lever assembly is a compact assembly that employs a single lever mounted directly to a valve in order to control the forward and reverse motion of the vehicle, the steering of the vehicle in a left, right or straight direction, and the speed or gear selection of the vehicle. The valve assembly is provided with eight hydraulic signal ports, at least one reservoir port, and at least one pressure supply port. The assembly further has four control spools positioned in respective control spool chambers spaced approximately ninety degrees apart and a fifth control spool positioned in a fifth, central spool chamber. A two-way pivot interconnects the fifth control spool and the control lever so that the control lever may pivot about two axes with respect to the fifth control spool. A cam assembly mounted to the control lever comprises a cam positioned adjacent first ends of the four control spools, a cam bracket mounted to the cam, and a bearing disposed between the cam bracket and the control lever so that the control lever may rotate axially with respect to the cam assembly. When the control lever rotates axially, it in turn causes a corresponding axial rotation of the fifth, central control spool.

29 Claims, 21 Drawing Sheets

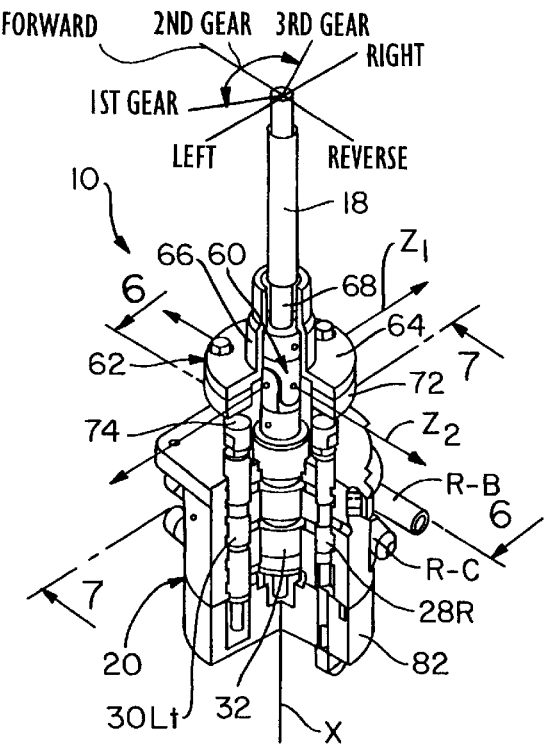
FIG. 1
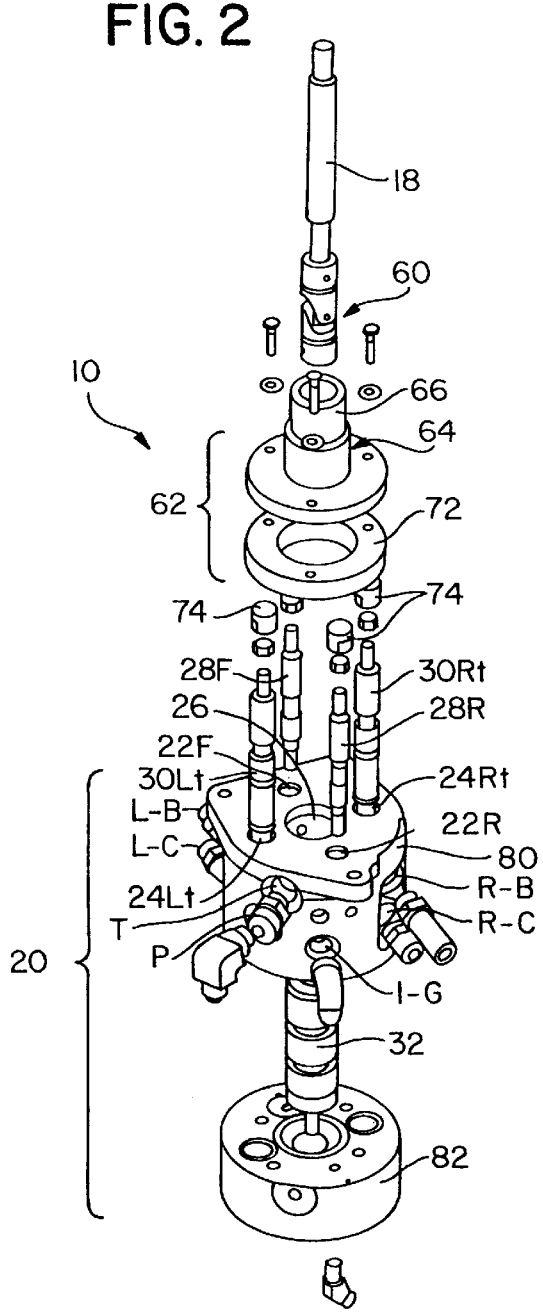
FIG. 2
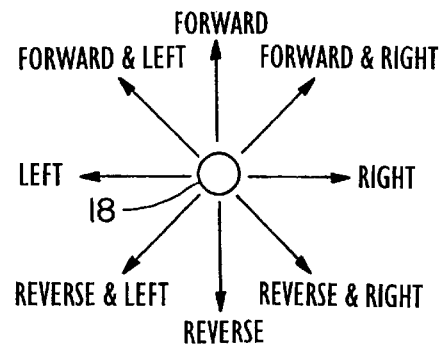
FIG. 1-A

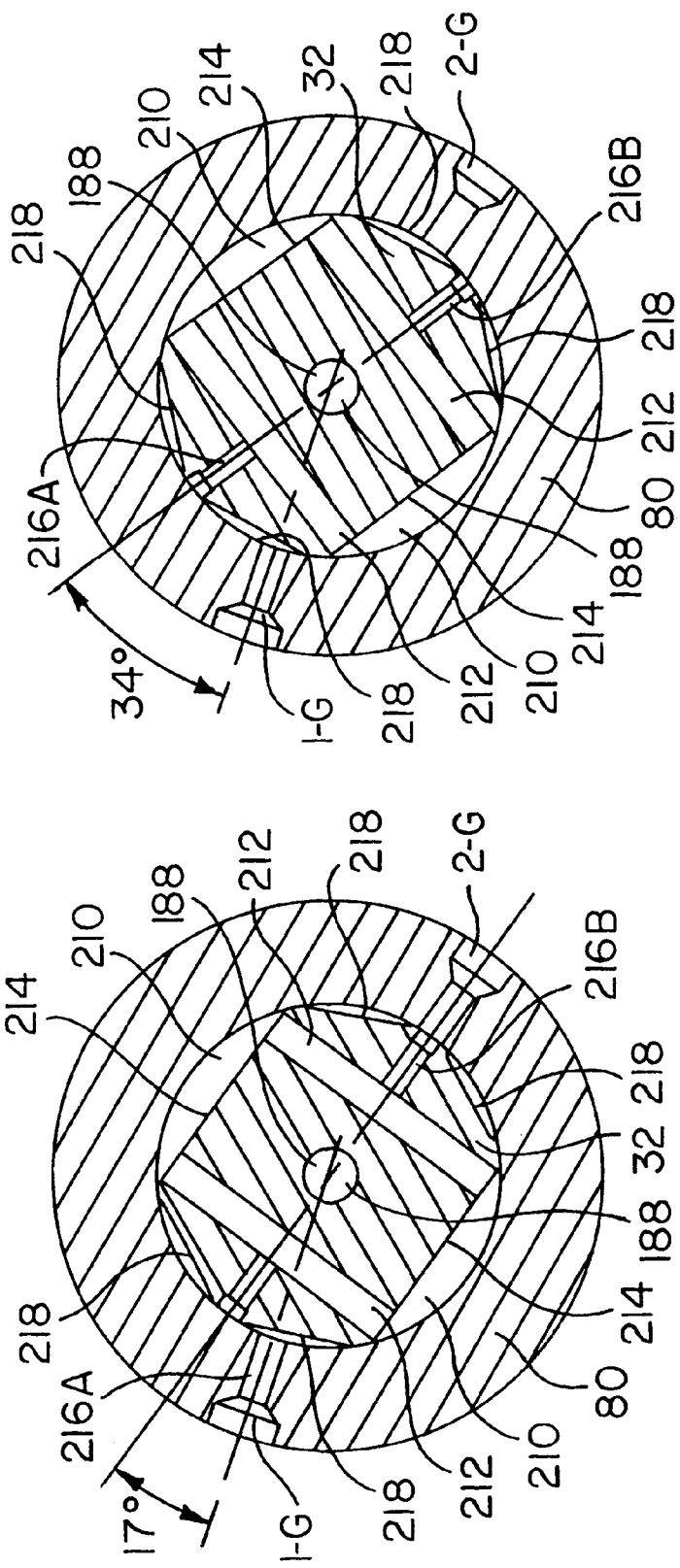

HYDRAULIC MOTION CONTROL VALVE AND LEVER

CROSS REFERENCE TO RELATED APPLICATION

This is a divisional of application Ser. No. 08/841,853, filed May, 5, 1997, now U.S. Pat. No. 5,868,230.

This application claims the benifits of U.S. Provisional Patent Application No. 60/018,437, filed May 28, 1996.

BACKGROUND OF THE INVENTION

The present invention relates to a hydraulic motion control or pilot valve and lever assembly for controlling the transmission and steering of a work vehicle such as a crawler tractor, articulated wheel loader or like construction vehicle. The invention particularly relates to a motion control valve and lever assembly that is compact and employs a single lever that is mounted directly to a valve and may be moved to activate three different valve functions.

Typical control valves and lever assemblies for construction vehicles such as a crawler tractor or articulated wheel loader may comprise of multiple levers and complex linkage systems that link the levers to various valves used to control the transmission and steering of the vehicle. The linkage systems between the levers and respective valves often require a multitude of moving parts that can add considerable cost and weight to the entire assembly and which often produce a greater "free play" in the mechanism whereby the response of the mechanism may be to sluggish and movement of the control levers may become difficult.

The present invention seeks to overcome some of the deficiencies of the prior art by providing a compact assembly with few moving parts and that employs a single control lever to effectuate control over the steering and transmission of a construction vehicle. The present invention further provides an assembly that minimizes the resistance that may be applied to the control lever as the control lever is moved.

SUMMARY OF THE INVENTION

The present invention provides a hydraulic motion control valve and lever assembly comprising a control lever, a valve assembly provided with eight hydraulic signal ports, at least: one tank or reservoir port and at least one pressure supply port. The valve assembly further has four spool chambers spaced approximately ninety degrees apart and a fifth central spool chamber. Four control spools are positioned in respective ones of the four sppol chambers, and a fifth control spool is positioned in the fifth central spool chamber.

A two-way pivot interconnects the fifth control spool and the control lever so that the control lever may pivot about two axes with respect to the fifth control spool. In addition, a cam assembly is mounted to the control lever. The cam assembly comprises a cam positioned adjacent first ends of the four control spools, a cam bracket mounted to the cam, and a bearing disposed between the cam bracket and the control lever so that the control lever may rotate axially with respect to the cam assembly. When the control lever rotates axially, it in turn causes a corresponding axial rotation of the fifth, central control spool.

The four control spools include two pairs of opposing control spools. One pair of opposing control spools may be used to control the steering of a vehicle in a let right, or straight direction, and the other pair of opposing control spools may be used to control the forward and reverse movement of the vehicle. When the control lever is pivoted about a one of the two axes, it operatively engages one of the two opposing steering spools, and when the control lever is pivoted about the second of the two axes, it operatively engages one of the two opposing forward and reverse spools.

The motion control valve and lever assembly also preferably has a detent mechanism coupled to the fifth control spool for temporarily holding or checking the movement of the fifth control spool as it moves between three operative positions. When the fifth control spool is in one of the three operative positions, the operator will be required to apply an additional force in order to overcome the detent force move the spool into a different position. In this way, the operator can "feel" when the fifth control spool is in an operative position. In one embodiment of the invention, the fifth control spool can be used to place in the vehicle's transmission into first, second, or third gear.

The motion control and lever assembly also preferably has a hydraulic detent coupled to at least two of the four control spools. The hydraulic detent serves to hold or check the control lever in an operative position by selectively holding or checking the movement of the control spools when the control lever is pivoted about one of the axes.

A gear or range selection display in accordance with the present invention, preferably, is coupled to the fifth control spool in order to display to the operator the gear selection. In one embodiment of the invention, the range selection display is electronic, and in another the embodiment, the display is non-electronic. Both embodiments, however, employ an indicator arm that is mounted directly to the fifth control spool and rotates with the fifth control spool when the control lever is rotated axially.

BRIEF DESCRIPTION OF THE DRAWINGS

The above and other objects and advantages of the invention will become apparent from consideration of the following detailed description when read in conjunction with the accompanying drawings, in which like reference characters refer to like parts throughout, and in which:

FIG. 1 is a perspective cutaway view of the motion control valve and lever assembly of the present invention illustrating the forward, reverse, left, right, first gear, second gear, and third gear positions of the control lever;

FIG. 1-A is a schematic top view of the control lever illustrating the forward, reverse, left, right, and combination movements of the lever;

FIG. 2 is an exploded perspective view of the motion control valve and lever assembly of FIG. 1;

FIG. 20B is a cross-sectional view similar to FIG. 20A showing the range selector spool in a second gear position;

FIG. 20C is a cross-sectional view similar to FIG. 20A showing the range selector spool in a third gear position;

Throughout the specification, the terms "forward", "rearward", "front", "back", "side", "right", "left", "up", "down", and variations thereof are used for convenience in describing the invention. These terms are not intended to be limiting.

Figure 3:
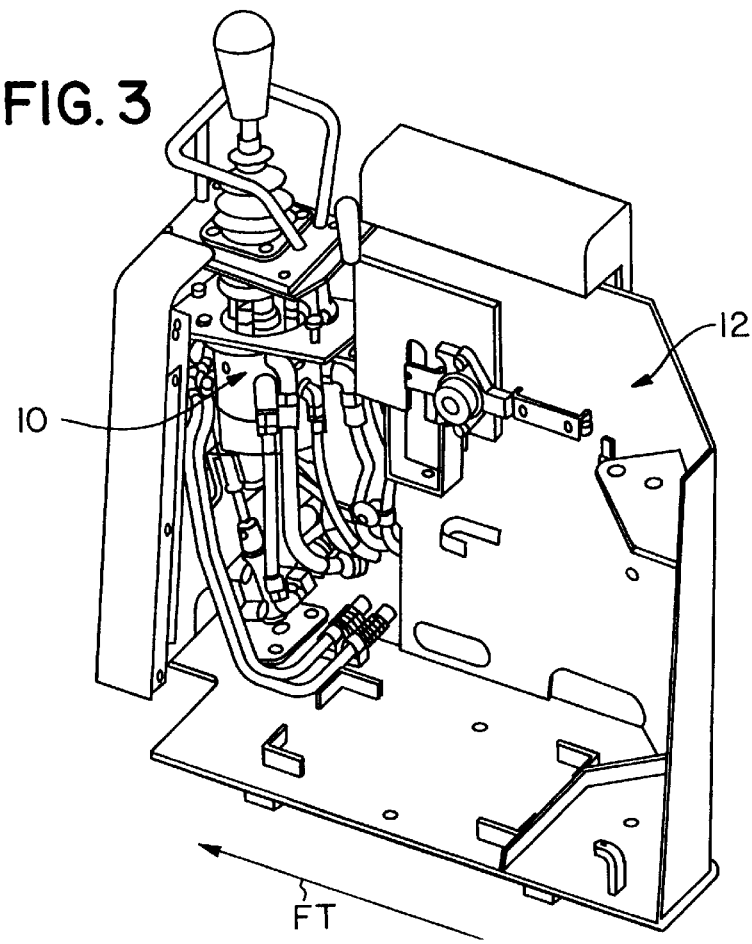
FIG. 3 is a perspective view of a tractor console equipped with the motion control valve and lever assembly of FIG. 1.
Figure 4A:
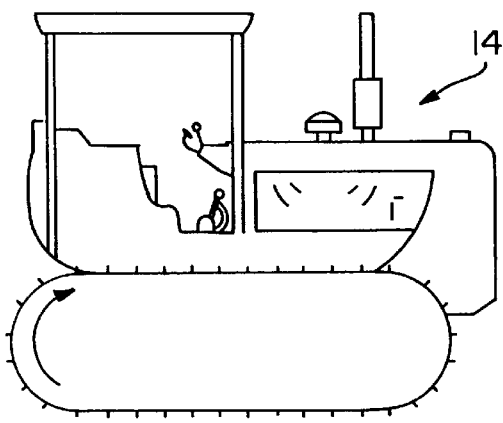
FIG. 4A is a schematic side view of a crawler tractor.
Figure 4B:
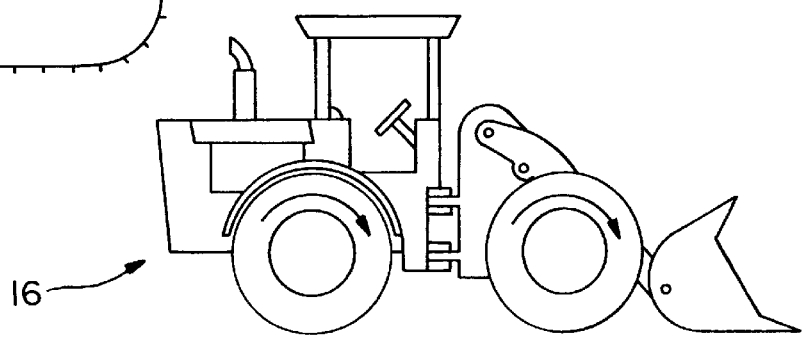
FIG. 4B is a schematic side view of an articulated wheel loader.

DETAILED DESCRIPTION OF THE INVENTION:

With reference to FIGS. 1 and 2, the present invention provides a hydraulic motion control valve and lever assembly 10 (sometimes referred to herein as a "control assembly") for use in controlling the transmission and steering of a work vehicle such as a crawler tractor, articulated wheel loader or dozer, or a like construction vehicle. FIG. 3 shows the control assembly mounted in the left-hand console 12 of a tractor wherein the front of the tractor is indicated by arrow FT. In addition, FIGS. 4A and 4B show examples of a crawler tractor 14 and an articulated wheel loader 16 with which the present invention may be used.

The control assembly 10 controls the forward and reverse motion, the steering to the left, right, or straight, and the speed or gear selection of the vehicle. In particular, the control assembly 10 has a control lever 18 which, as indicated in FIG. 1, may be moved: (a) forward or backward in order to move the vehicle in the forward or reverse direction, (b) side-to-side in order to steer the vehicle to the left or right, and (c) rotationally in order to place the vehicle's transmission into first, second or third gear or speed.

The control assembly 10 comprises a generally cylindrically-shaped valve body 20 which has five vertically-extending holes or chambers 22F, 22R, 24Lt, 24Rt, 26 for receiving five respective control spools 28F, 28R, 30Lt, 30Rt, 32. The valve body has eight (8) hydraulic signal outputs (F, R, L-B, L-C, R-B, R-C, 1-G, 2-G), one (1) hydraulic tank output T, and one (1) hydraulic pressure supply input P. As explained in more detail further below, the control spools 28F, 28R, 30Lt, 30Rt, and 32 control the flow of hydraulic fluid between the pressure supply input P or tank output T and selected ones of the hydraulic outputs F, R, L-B, L-C, R-B, R-C, 1-G, and 2-G.

Figure 5:
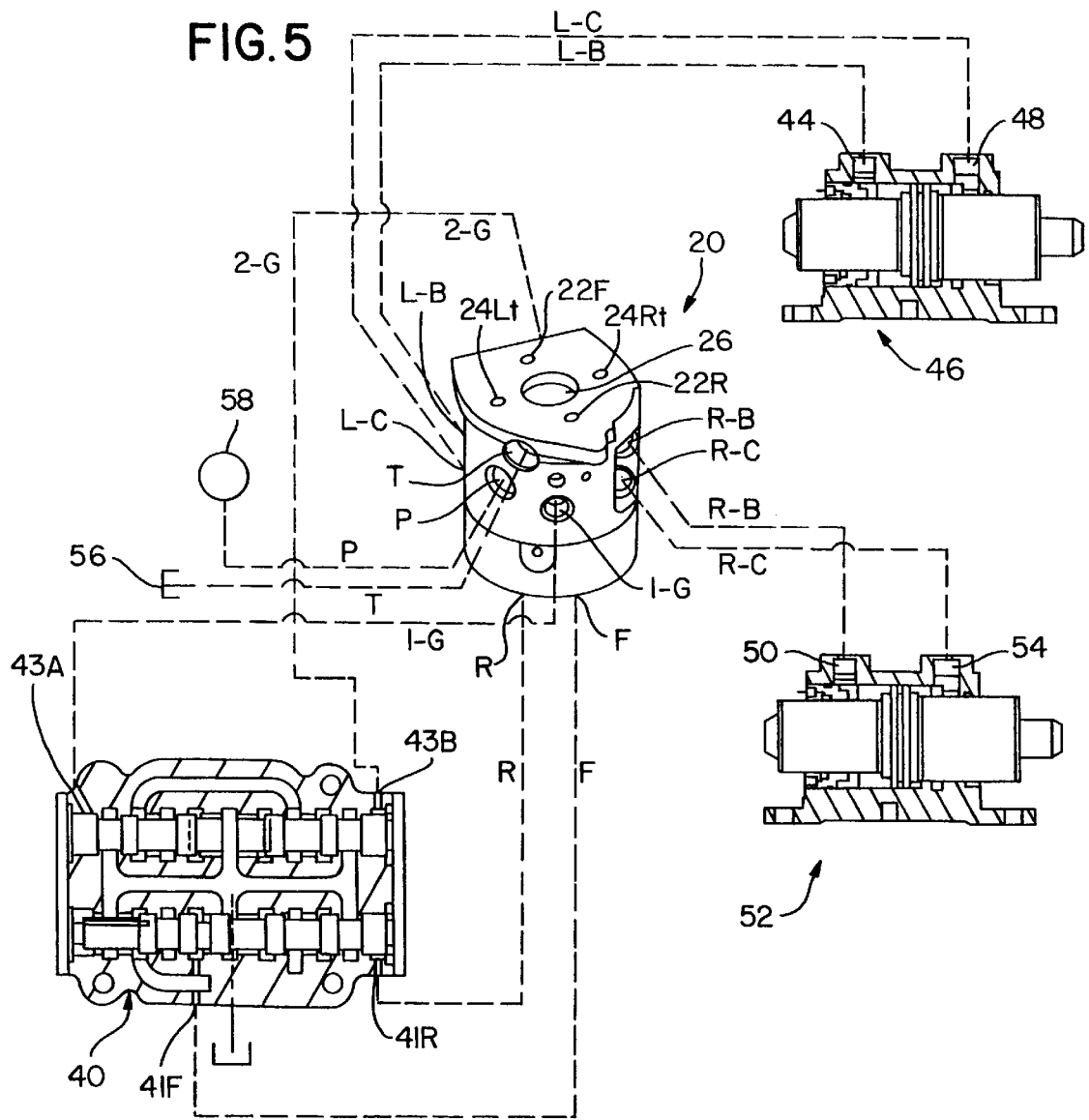
FIG. 5 is a system diagram illustrating the interconnection between the valve body of the motion control valve and lever assembly and various components of a work vehicle.

FIG. 5 shows the various hydraulic outputs (F, R, L-B, L-C, R-B, R-C, 1-G, 2-G and T) and the hydraulic input (P) of the valve body 20 and the interconnection of these outputs and input with various components of the vehicle. In particular, FIG. 5 shows: (1) the forward signal output F fluidically connected to a forward signal input 41F of a range selector valve 40 for making the vehicle move forward; (2) the reverse signal output R fluidically connected to a reverse signal input 41R of the range selector valve 40 for making the vehicle move in a reverse direction; (3) the left brake output L-B fluidically connected to the brake port 44 of a left steering cylinder 46 of the vehicle; (4) the left clutch output L-C fluidically connected to the clutch port 48 of the left steering cylinder 46; (5) the right brake output R-B fluidically connected to the brake port 50 of a right steering cylinder 52 of the vehicle; (6) the right clutch output R-C fluidically connected to the clutch port 54 of the right steering cylinder 52; (7) the first gear signal port 1-G fluidically connected to a first gear signal input 43A of the range selector valve 40; and (8) the second gear signal port 2-G fluidically connected to a second gear signal input 43B of the range selector valve 40. The tank output T is fluidically connected to a hydraulic fluid tank or reservoir 56, and the pressure supply input P is fluidically connected to a source 58 of hydraulic fluid (for a crawler tractor, the pressure level of the pressure source may be approximately 270 PSI (pounds per square inch)).

Figure 6:
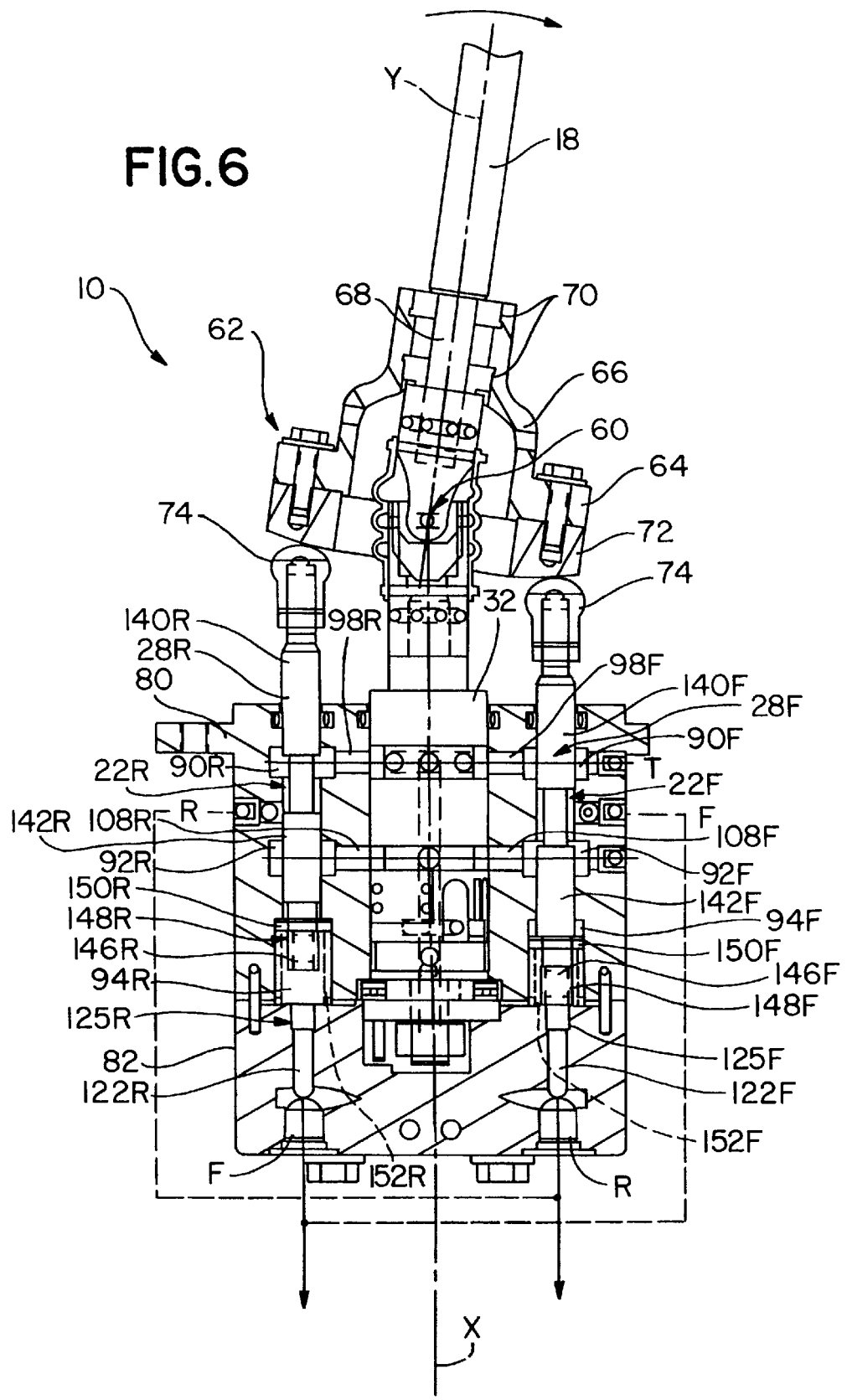
FIG. 6 is a side cross-sectional view of the motion control valve and lever assembly taken along line 6—6 of FIG. 1, illustrating the reverse and forward signal spools of the assembly and showing the control lever in a forward position.
Figure 7:
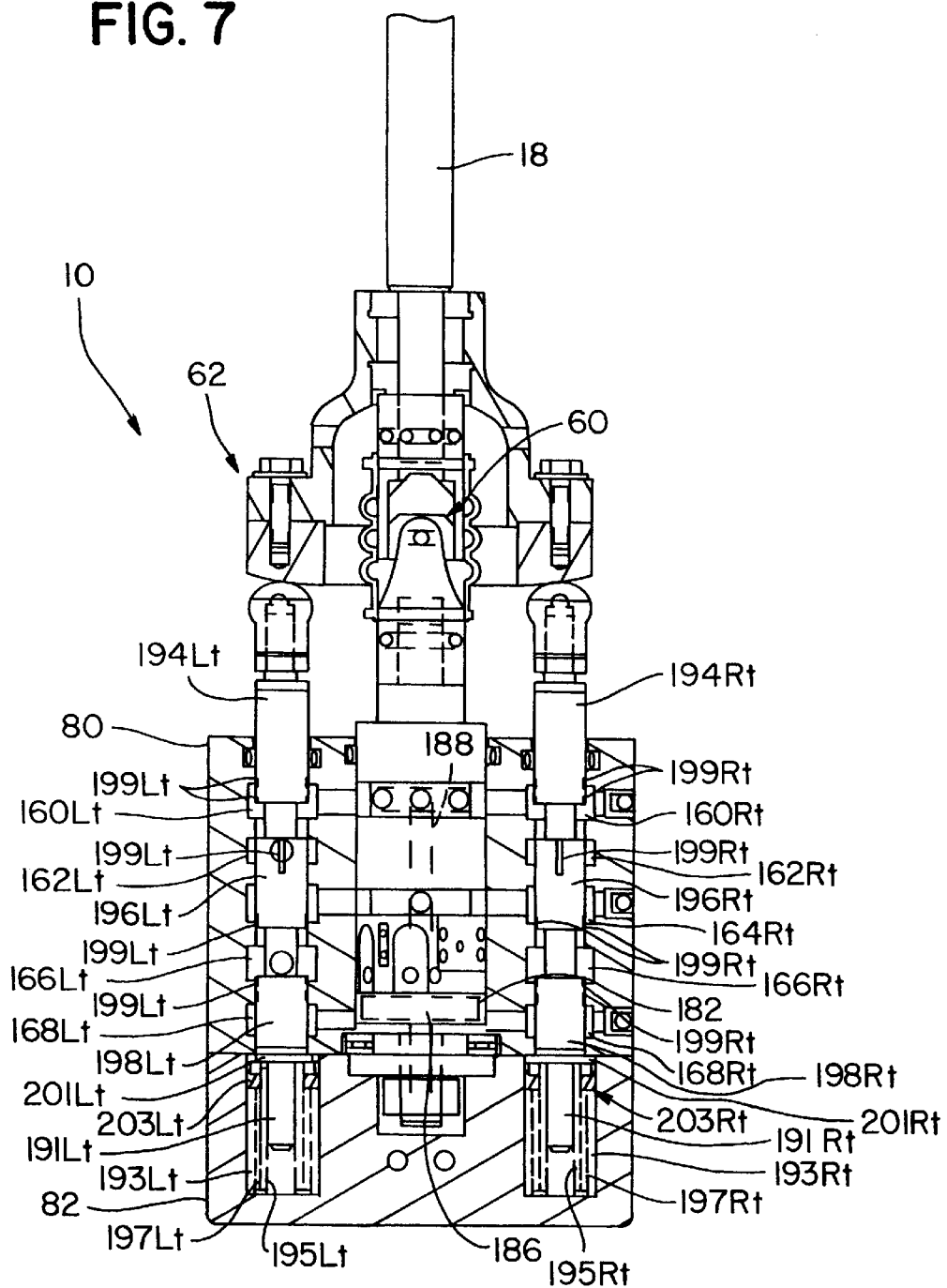
FIG. 7 is a side cross-sectional view of the motion control valve and lever assembly taken along line 7—7 of FIG. 1, illustrating the left and right steering spools of the assembly.

With reference to FIGS. 2, 6, and 7, the control spools include four smaller spools 28F, 28R, 30Lt, and 30Rt which are uniformly spaced about a central, vertical axis X of the valve body 20. Two of the smaller spools 28F, 28R (sometimes referred to herein as "forward" or "reverse signal spools") are diametrically opposite each other and are associated with the forward and reverse motions of the vehicle. The other two diametrically-opposing spools 30Lt, 30Rt (sometimes referred to herein as "left" or "right steering spools") are associated with the left and right motions of the vehicle. The fifth control spool 32 is a larger spool which extends substantially along the central axis X of the valve body 20 and is attached to the control lever 18 through a two-way pivot or universal joint 60. The fifth spool 32 (sometimes referred to herein as a "range selector spool") is associated with the speed or gear selection.

Attached to the control lever 18 is a cam assembly 62 which engages the tops of the smaller spools 28F, 28R, 30Lt, 30Rt in order to selectively move the smaller spools down or allow the smaller spools to move upward. As discussed in more detail further below, each of the smaller spools is spring-biased upwardly. The cam assembly 62, therefore, selectively presses the spools downward against the spring force.

The cam assembly 62 comprises a cam bracket 64 having an upwardly-extending stem 66 which encircles the lower end 68 of the control lever 18. As more clearly shown in FIGS. 6 and 7, the cam stem 66 also serves as a housing for a pair of circular ball bearings 70. The ball bearings 70 allow the control lever 18 to rotate freely in the cam bracket 64 about the control lever's central axis Y.

The cam assembly 62 further comprises a cam ring 72 which is bolted coaxially to the bottom of the cam bracket 64. The cam ring 72 engages the tops of the smaller control spools 28F, 28R, 30Lt, 30Rt. When the control lever 18 is pivoted forward or reverse, or to the left or right, or any combination thereof as shown in FIG. 1-A, the cam ring 72 correspondingly tilts to one side pressing downward a selected spool 28F, 28R, 30Lt, or 30Rt or combination of spools (28F and 30Lt or 30Rt; or 28R and 30Lt or 30Rt). When moved in the forward or reverse direction, the control lever 18 pivots about the $Z_1$ axis passing through the universal joint 60 (FIG. 1). When moved to the right or left, the control lever 18 pivots about the $Z_2$ axis also passing through the universal joint 60.

The tops of the smaller spools 28F, 28R, 30Lt, 30Rt are provided with respective caps 74 having rounded upper surfaces. Preferably, the bottom surface of the cam ring 72 is conical in shape so that it inclines upwardly as it extends radially outward. The rounded surfaces of the spool caps 74 and the conical shape of the cam ring 72 allow the cam ring to more easily "rock" on the spools when the cam ring is tilted. As discussed in more detail below, when one of the forward or reverse control spools 28F, 28R is pressed downward by one side of the cam ring 72, the other of the forward or reverse control spools 28F, 28R follows the raised side of the tilted cam ring 74 upward under the force of hydraulic pressure. When one of the left or right steering spools 30Lt, 30Rt is pressed downward by the cam ring 72, the other steering spool, however, does not move upward.

The valve body 20 comprises an upper valve housing 80 and a bottom cover assembly 82 which is mounted to the bottom of the valve housing 80. FIGS. 9–13G show the details of the valve housing 80, and FIGS. 14–18 show the details of the bottom cover assembly 82. The five vertically-extending holes or chambers 22F, 22R, 24Lt, 24Rt, 26 for the control spools 28F, 28R, 30Lt, 30Rt, 32 extend through the upper valve housing 80.

The following is a description of the components associated with the forward and reverse operation of the invention. The spool chambers 22F, 22R for the forward and reverse signal spools 28R, 28F each have three vertically-spaced-apart subchambers (90F, 92F, 94F, and 90R, 92R, 94R) that are larger in diameter than the remaining portions of the vertical chambers (FIG. 13F).

Figure 13B:
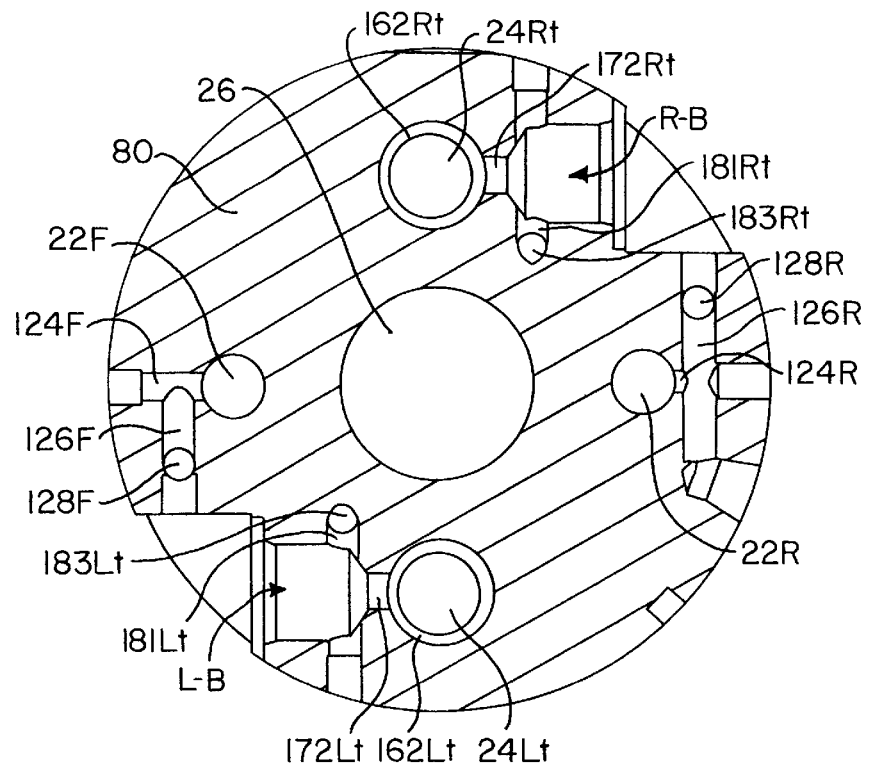
FIG. 13B is a top cross-sectional view of the upper valve housing taken along line 13B—13B of FIG. 11.
Figure 13A:
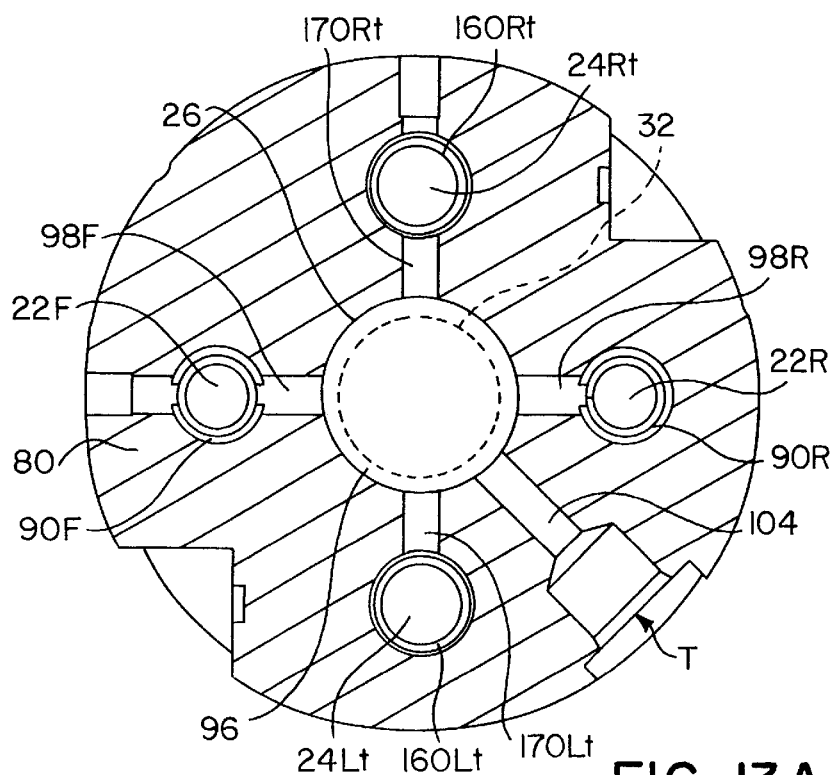
FIG. 13A is a top cross-sectional view of the upper valve housing taken along line 13A—13A of FIG. 11.
Figure 13D:
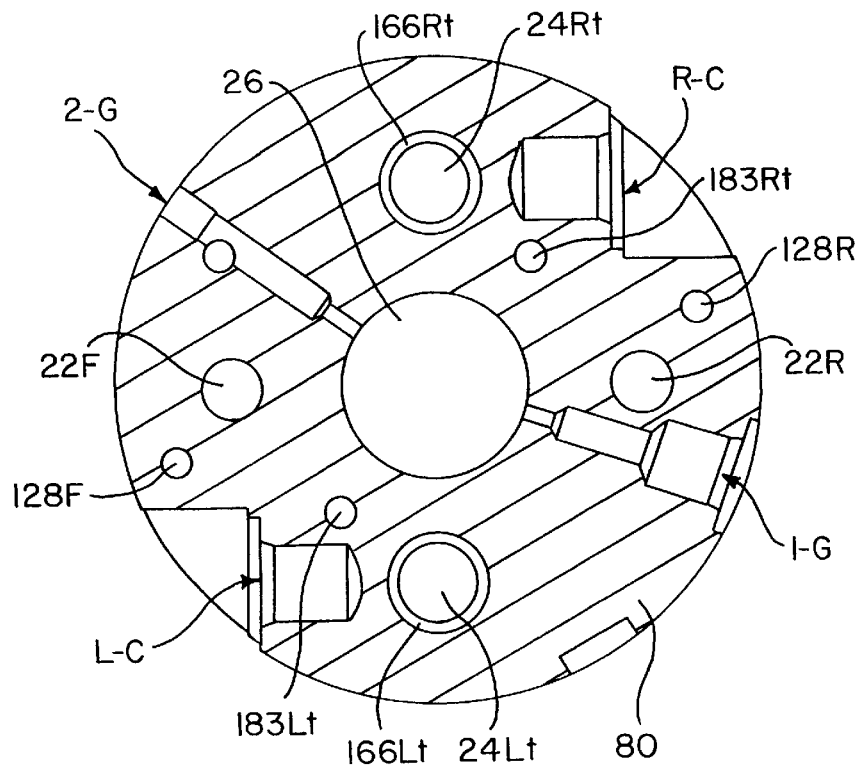
FIG. 13D is a top cross-sectional view of the upper valve housing taken along line 13D—13D of FIG. 11.

With reference to FIG. 13A, the upper subchambers 90F, 90R of the forward and reverse spool chambers 22F, 22R are fluidically connected to the tank output T. In particular, the upper forward subchamber 90F and the upper reverse subchamber are both coupled to an upper circumferential passageway 96 via forward and reverse upper radial passageways 98F, 98R, respectively. The upper circumferential passageway 96 is defined by an indented segment 102 (FIG. 19) that extends about the circumference of the fifth center spool 32 and the inner walls of the fifth vertical spool chamber 26. A third upper passageway 104 fluidically connects the upper circumferential passageway 96 to the tank output T.

Figure 13C:
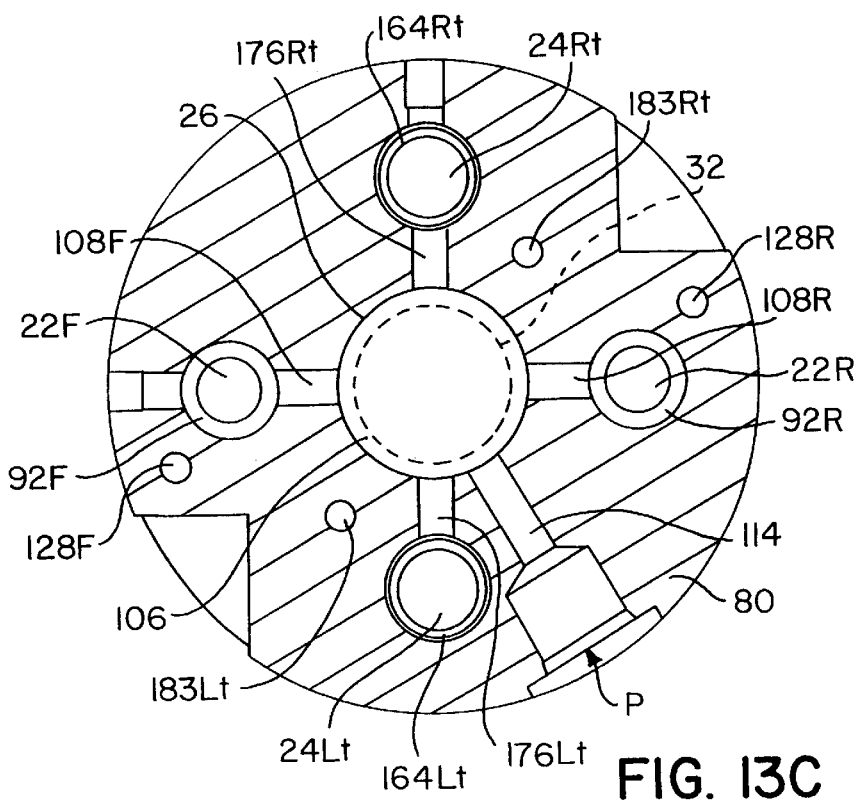
FIG. 13C is a top cross-sectional view of the upper valve housing taken along line 13C—13C of FIG. 11.

With reference to FIG. 13C, the middle subchambers 92F, 92R of the forward and reverse spool chambers 22F, 22R are fluidically connected to the pressure supply input P. In particular, the middle forward subchamber 92F and the middle reverse subchamber 92R are both coupled to a middle circumferential passageway 106 via forward and reverse middle radial passageways 108F, 108R, respectively. The middle circumferential passageway 106 is defined by a indented segment 112 (FIG. 19) that extends about the circumference of the fifth center spool 32 and the inner walls of the fifth vertical spool chamber 26. A third middle passageway 114 fluidically connects the middle circumferential passageway 106 to the pressure supply input P.

Figure 13E:
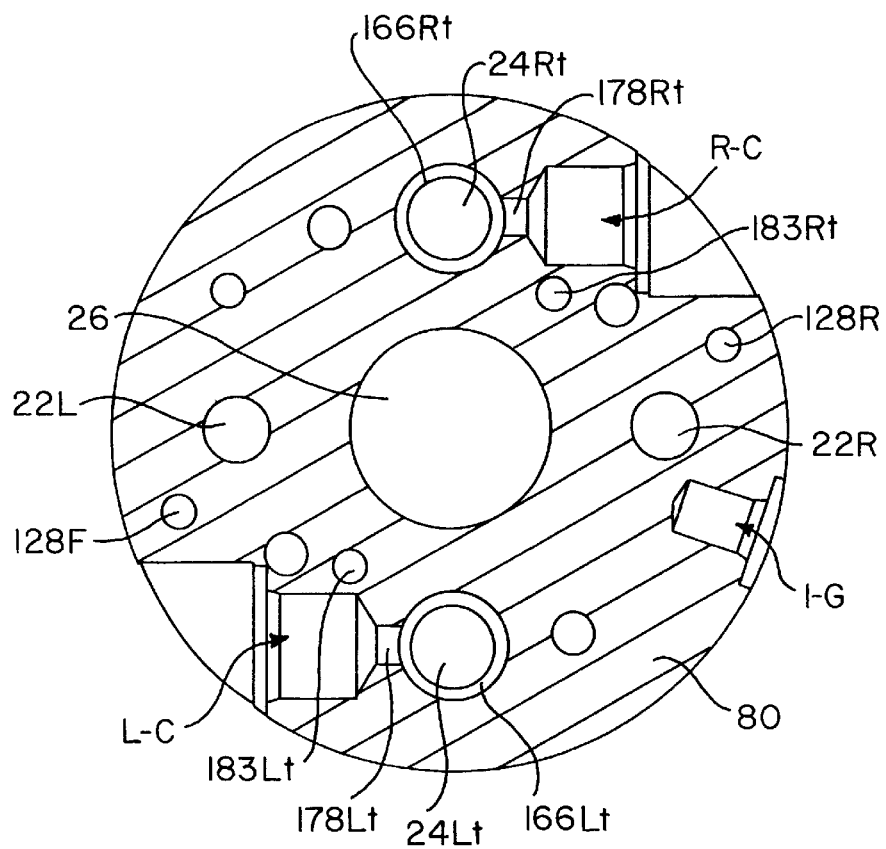
FIG. 13E is a top cross-sectional view of the upper valve housing taken along line 13E—13E of FIG. 11.
Figure 13H:
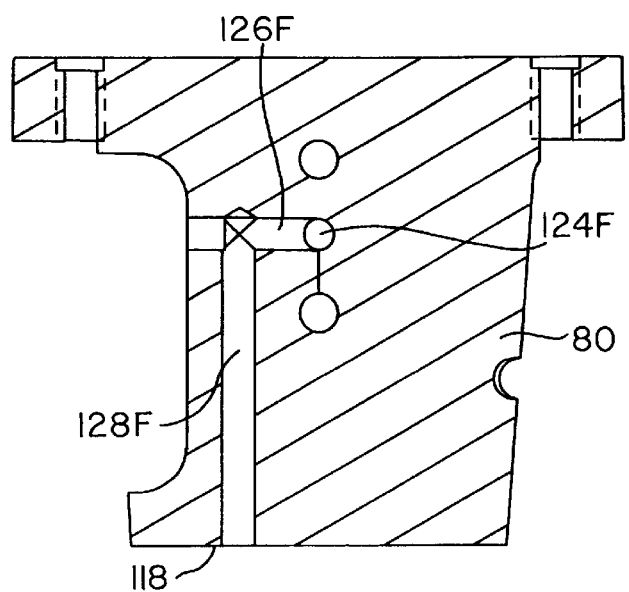
FIG. 13H is a rear cross-sectional view of the upper valve housing taken along line 13H—13H of FIG. 11.
Figure 13F:
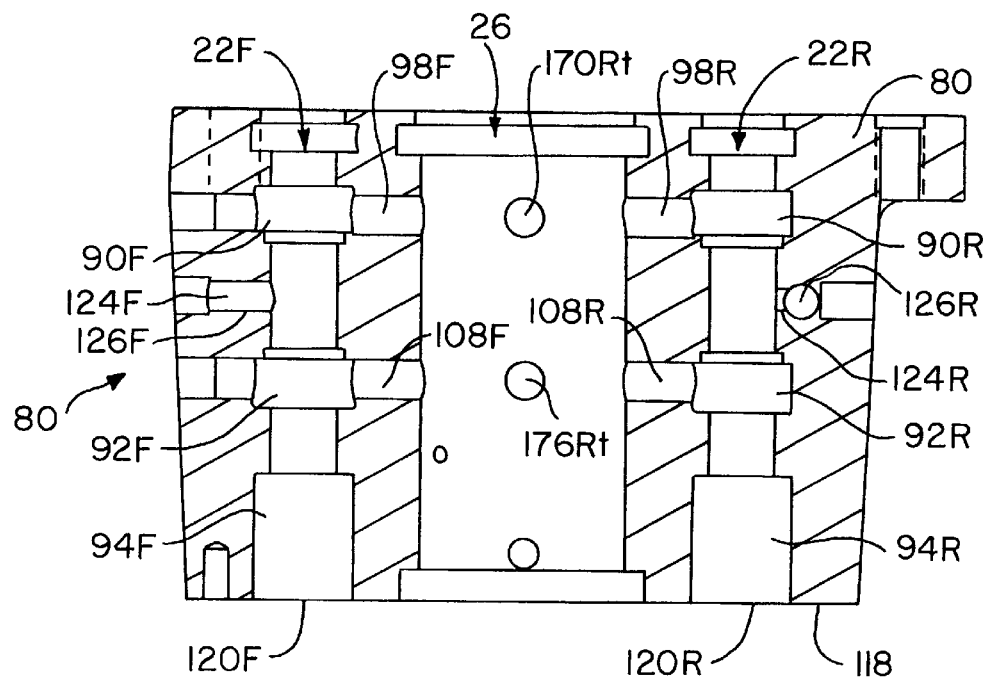
FIG. 13F is a side cross-sectional view of the upper valve housing taken along line 13F—13F of FIG. 9.

As shown in FIG. 13F, the lower subchambers 94F, 94R of the forward and reverse spool chambers 22F, 22R open to the bottom 118 of the upper valve housing 80. As discussed in more detail below, the openings 120F, 120R of the lower subchambers 94F, 94R are fluidically connected to respective vertical passages 122F, 122R (FIG. 6) in the bottom cover assembly. The vertical passages 122F, 122R are in turn fluidically coupled to the reverse signal output R and the forward signal output F, respectively. As shown in FIG. 6, the vertical passage 122F is aligned with the forward spool chamber 22F and the reverse signal output R, and the vertical passage 122R is aligned with the reverse spool chamber 22R and the forward signal output F. Disposed in each of the vertical passages 122F, 122R near the tops is a respective orifice plug 125F, 125R having a central, vertically-extending, through hole (not shown).

The forward and reverse spool chambers 22F, 22R are also fluidically connected to the forward and reverse signal outputs F, R via respective internal passages extending through both the valve housing 80 and bottom cover assembly 82. The internal passages in the valve housing 80 connecting the forward spool chamber 22F and the forward signal output F include: a radial internal passage 124F fluidically connected to the forward spool chamber 22F between the upper and middle subchambers 90F, 92F; a horizontal internal passage 126F fluidically connected to the radial internal passage 124F; and a vertical internal passage 128F fluidically connected to the horizontal internal passage 126F and extending to the bottom 118 of the valve housing 80 as shown in FIG. 13H. Similar internal passages 124R, 126R, 128R are provided in the valve housing 80 to connect the reverse spool chamber 22R, between the upper and middle subchambers 90R, 92R, and the reverse signal output R.

The vertical internal passages 128F, 128R of the valve housing 80 are fluidically connected to a series of internal passages in the bottom cover assembly 82 as shown in FIGS. 14, 15, 16A, and 16B. The internal passages of the bottom cover assembly 82 include: vertical internal passages 130F, 130R that are connected to the vertical internal passages 128F, 128R, respectively, of the valve housing 80; and horizontal internal passages 132F, 132R that connect the respective vertical internal passages 130F, 130R to the forward and reverse signal outputs F, R. The horizontal internal passages 132F, 132R are also connected to the vertical passages 122R, 122F, respectively.

With reference to FIG. 6, each of the forward and reverse control spools 28F, 28R has upper and lower radially enlarged segments 140F, 140R, and 142F, 142R which selectively block the flow of fluid between the forward and reverse signal outputs F, R and either the pressure supply input P and the tank output T. In particular, the upper segments 140F, 140R selectively block the flow of fluid between the upper radial passageways 98F, 98R (connected to the tank output T) and the respective forward and reverse radial passages 124F, 124R (connected to the forward and reverse signal outputs F, R). The lower segments 142F, 142R selectively block the flow of fluid between the middle radial passageways 108F, 108R (connected to the pressure supply input P) and the respective forward and reverse radial passages 124F, 124R (connected to the forward and reverse signal outputs F, R). The diameters of the enlarged segments 140F, 140R, 142F, 142R are substantially equal to the inner diameter of spool chambers 22F, 22R, between subchambers.

The lower ends 146F, 146R of the forward and reverse control spools 28F, 28R terminate in lower subchambers 94F, 94R, respectively. Each lower end 146F, 146R is also provided with a respective threaded stop nut 148F, 148R and a washer 150F, 150R which is free to slide on the spool. The outer diameter of each washer 150F, 150R is wider and the inner diameter smaller than the respective lower radially-enlarged sections 142F, 142R of the control spools 28F, 28R.

Each lower subchamber 94F, 94R further holds a respective compression spring 152F, 152R which encircles the respective stop nut 148F, 148R and acts against the underside of the washer 150F, 150R. The springs 152F, 152R press against the respective washers 150F, 150R which in turn press against respective bottom edges of the lower radially-enlarged sections 142F, 142R, thereby biasing the forward and reverse spools 28F, 28R upward.

When the control lever 18 is in a neutral position (upright) position no hydraulic pressure is fed to either the forward or reverse signal outputs F, R. and the vehicle, therefore, does not move. In particular, the middle radial passageways 108F, 108R are blocked by the lower enlarged segments 142F, 142R of the control spools 28F, 28R so that hydraulic fluid cannot flow from the pressure supply input P to either the forward or reverse spool chambers 22F, 22R. The upper radial passageways 98F, 98R, however, are not blocked by the upper enlarged segments 140F, 140R and, therefore, hydraulic fluid is free to flow from the forward and reverse spool chambers 22F, 22R to the tank output T.

When the control lever 18 is tilted to the forward position as shown in FIG. 6, the forward control spool 28F moves downward. The lower radially enlarged segment 142F of the forward control spool 28F engages the top of the forward washer 150F forcing the forward washer 150F downward to compress the forward spring 152F. The lower enlarged segment 142F also no longer blocks the forward middle passageway 108F so that hydraulic fluid may flow from the pressure supply input P into forward spool chamber 22F and out the radial internal passage 124F to the forward signal output F. The upper enlarged segment 140F blocks the forward upper passageway 98F leading to the tank output T so that the hydraulic fluid does not drain from the forward spool chamber 22F to the tank output T. Hydraulic fluid exiting the forward signal output F flows to the forward signal input 41F of the range selection valve 40 where the fluid is diverted to move the vehicle forward.

As the forward control spool 28F moves downward, the reverse control spool 28R moves upward under the force of hydraulic pressure fed to the lower reverse subchamber 94R through the reverse orifice plug 125R and from the forward signal output F. As mentioned above, the reverse vertical passage 122R in the bottom cover assembly 82 is fluidically connected to the forward signal output F and, therefore, receives hydraulic fluid when the forward signal output F receives hydraulic fluid. The orifice plug 125R slows the upward flow of hydraulic and, therefore, the upward movement of the reverse control spool R The hydraulic pressure behind the reverse control spool 28R (in the reverse lower subchamber 94R) forms a hydraulic detent which holds the control lever 18 in the forward position by pushing the reverse control spool 28R upward. The reverse stop nut 148R prevents the reverse signal spool 28R from continuing upward and applying the hydraulic detent (force) to the cam ring 72. This reduces the effort required to rotate the control lever 18 for gear selection (discussed further below) by reducing the load on the ball bearings 70, U-joint 60, and thrust bearings 228 (discussed further below). When the lever 18 is pulled back towards the neutral, upright position, the operator must work against the hydraulic detent (hydraulic pressure behind the reverse control spool 28R) in order to depress the reverse control spool 28R downward. The forward control spool 28F follows the cam ring 72 and moves upward. At about the halfway point of the control spool 28F moving upward the hydraulic holding pressure is dumped to the tank output T, and the springs 152F, 152R snap the control lever 18 into the neutral position.

When the control lever 18 is pulled backward into the reverse position the opposite occurs. In particular, the reverse control spool 28R is pushed downward allowing hydraulic fluid to flow from the pressure supply input P to the reverse signal output R, and preventing hydraulic fluid from draining from the reverse spool chamber 22R to the tank output T. Hydraulic pressure behind the forward control spool from the reverse signal output R holds the control lever 18 in the reverse position. Hydraulic fluid exiting the reverse signal output F flows to the reverse signal input 41F of the range selection valve 40 where the fluid is diverted to move the vehicle in a reverse direction.

Figure 13G:
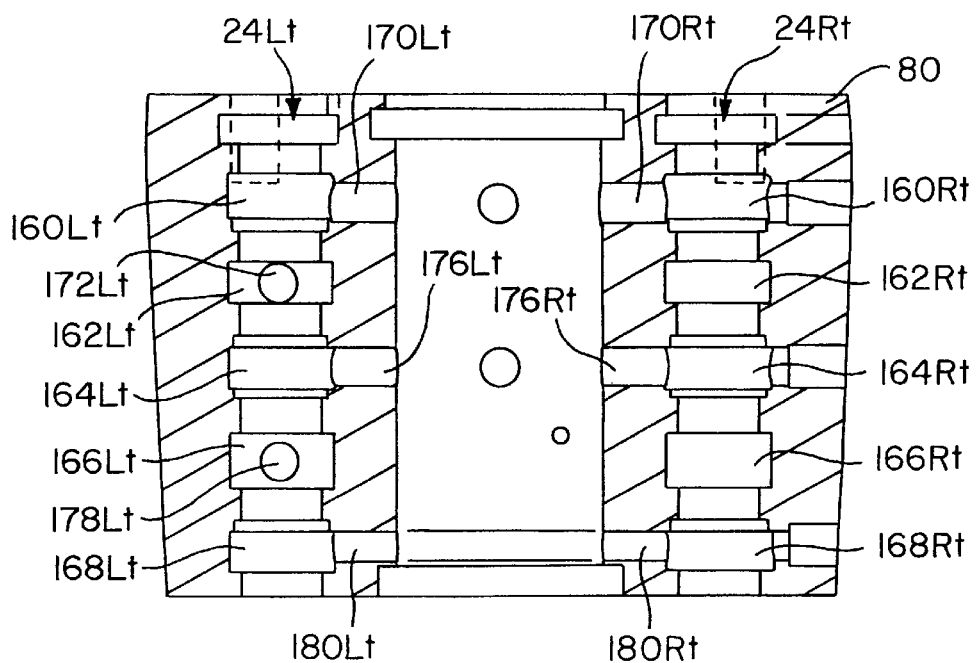
FIG. 13G is a rear cross-sectional view of the upper valve housing taken along line 13G—13G of FIG. 9.

The features associated with the steering of the vehicle to the left and right will now be described. With reference to FIG. 13G, the spool chambers 24Lt, 24Rt for the left and right steering spools 30Lt, 30Rt each have five vertcally-spaced-apart subchambers 160Lt, 160Rt, 162Lt, 162Rt, 164Lt, 164Rt, 166Lt, 166Rt, 168Lt, 168Rt that are larger in diameter than the remaining portions of the vertical spool chambers 24Lt, 24Rt.

The upper (or first) subchambers 160Lt, 160Rt of the steering spool chambers 24Lt, 24Rt are fluidically connected to the tank output T. In particular, the upper left subchamber 160Lt and the upper right subchamber 160Rt are coupled to the upper circumferential passageway 96 formed about the fifth center spool 32 via upper left and right radial passageways 170Lt, 170Rt, respectively. As described further above, the upper tank passageway 104 fluidically connects the upper circumferential passageway 96 to the tank output T.

The next lower (or second) subchambers 162Lt, 162Rt of the steering spool chambers 24Lt, 24Rt are fluidically connected to the left and right brake outputs L-B, R-B. As shown in FIG. 13B, the second subchambers 162Lt, 162Rt are fluidically connected to respective horizontal passages 172Lt, 172Rt which in turn are fluidically connected to the left and right brake outputs L-B, R-B.

With reference to FIG. 13C, the middle (or third) subchambers 164Lt, 164Rt of the steering spool chambers 24Lt, 24Rt are fluidically connected to the pressure supply input P. In particular, the left middle subchamber 164Lt and the right middle subchamber 164Rt are coupled to the middle circumferential passageway 106 formed about the fifth center spool 32 via left and right middle radial passageways 176Lt, 176Rt, respectively. As described further above, the middle pressure passageway 114 fluidically connects the middle circumferential passageway 106 to the pressure supply input P.

The next lower (or fourth) subehambers 166Lt, 166Rt of the steering spool chambers 24Lt, 24Rt are fluidically connected to the left and right clutch outputs L-C, R-C. As shown in FIG. 13E, the fourth subchambers 166Lt, 166Rt are fluidically connected to respective horizontal passages 178Lt, 178Rt which in turn are fluidically connected to the left and right clutch outputs L-C, R-C.

The lowermost (or fifth) subchambers 168Lt, 168Rt of the steering spool chambers 24Lt, 24Rt are fluidically connected to the tank output T. In particular, the lowermost subchambers 168Lt, 168Rt are fluidically connected to respective left and right lower radial passages 180Lt, 180Rt which in turn are fluidically coupled to a lower circumferential passageway 182 (FIG. 7) associated with the fifth center spool 32. The lower circumferential passageway 182 is defined by an indented segment 184 (FIG. 19) that extends about the circumference of the fifth center spool 32 and the inner walls of the fifth vertical spool chamber 26. A lower radial passageway 186 extending across the fifth center spool 32 fluidically couples the lower circumferential passageway 182 to a central vertical hole 188 in the fifth center spool 32. Upper radial passageways 190 in the fifth center spool fluidically couple the central vertical hole 188 to the upper circumferential passageway 96 which, as described previously, is fluidically coupled to the tank output T.

With reference to FIG. 7, each of the left and right steering spools 30Lt, 30Rt has an upper 194Lt, 194Rt, a middle 196Lt, 196Rt, and a lower 198Lt, 198Rtradially-enlarged segment which selectively blocks the flow of hydraulic fluid between the tank output T and pressure supply input P and the clutch and brake outputs L-C , R-C, L-B, R-B. The upper enlarged segments 194Lt, 194Lt selectively block and control the flow of fluid between the respective brake outputs L-B, R-B and the tank output T. The middle enlarged segments 196Lt, 196Rt selectively block and control the flow of hydraulic fluid from the pressure supply input P to respective brake and clutch outputs L-B, R-B, L-C, R-C. The lower enlarged segments 198Lt, 198Rt selectively block and control the flow of hydraulic fluid between the respective clutch outputs L-C, R-C and the tank output T. The enlarged segments 194Lt, 194Rt, 196LT, 196Rt, 198Lt, 198Rt have various metering notches 199Lt, l99Rt for providing gradual pressure changes as the left and right steering spools 30Lt, 30Rt move up or down.

The lower ends of the left and right spools or the spool stems 191Lt, 191Rt extend into the bottom cover assembly 82. The bottom cover assembly 82 has left and right bores 193Lt, 193Rt which open to the top of the cover assembly 82 and which accommodate, respectively, the spool stems 191Lt, 191Rt. Each of the bores 193Lt, 193Rt also accommodates a respective inner compression spring 195Lt, 195Rt and a respective outer compression spring 197Lt, 197Rt. The spool stems 191Lt, 191Rt align the respective inner springs 194Lt, 195Rt. Furthermore, the upper ends of the inner springs 195Lt, 195Rt press against respective washers 201Lt, 201Rt disposed on the spool stems 191Lt, 191Rt. The outer springs 197Lt, 197Rt are aligned by respective one-piece spacers 203Lt, 203Rt which the upper ends the outer springs 197Lt, 197Rt press against.

Figure 14:
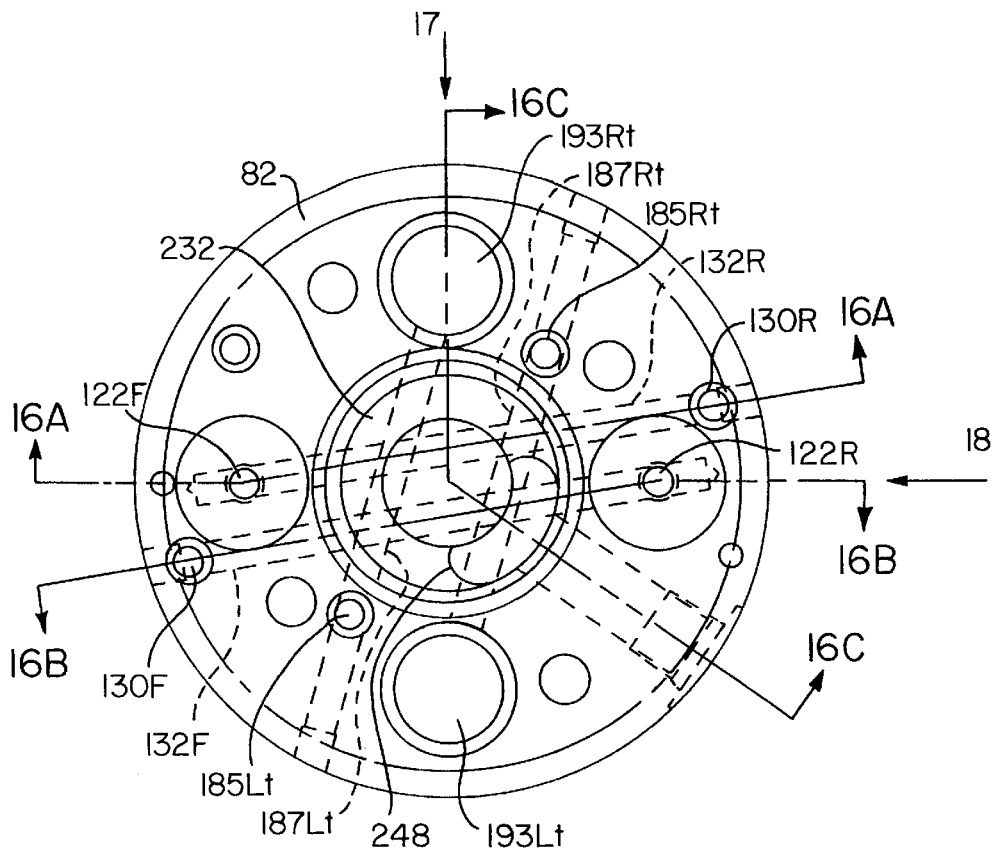
FIG. 14 is a top view of the bottom cover assembly of the valve body.
Figure 15:
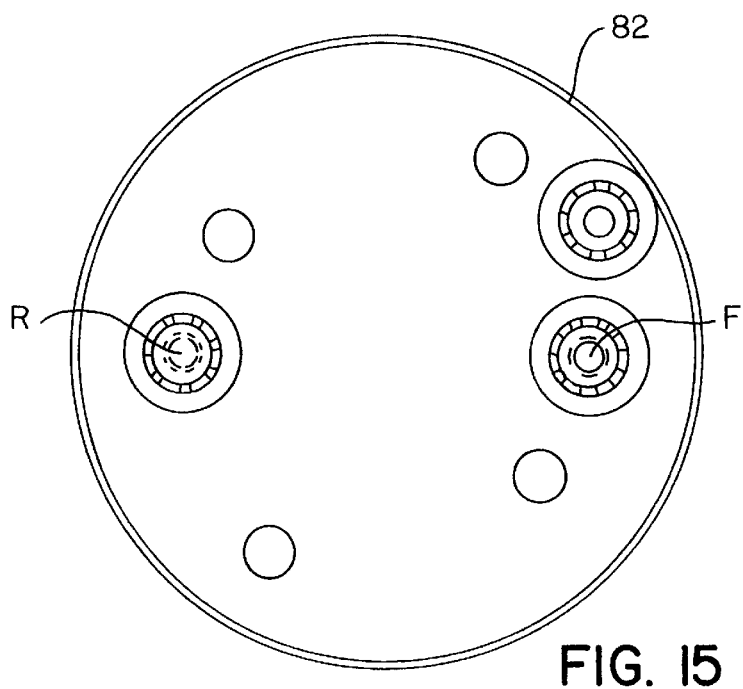
FIG. 15 is a bottom view of the bottom cover assembly of FIG. 14.
Figure 16A:
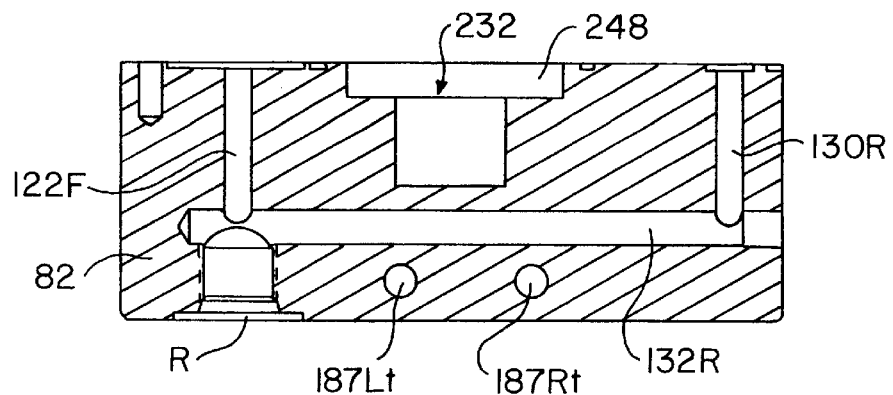
FIG. 16A is a cross-sectional view of the bottom cover assembly taken along line 16A—16A of FIG. 14.
Figure 16B:
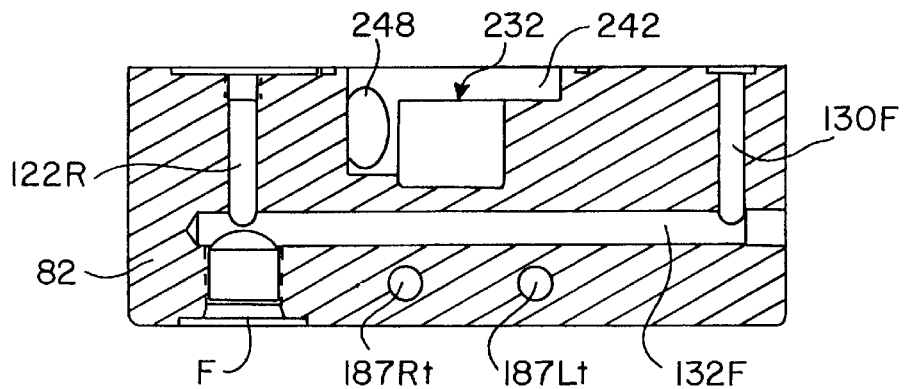
FIG. 16B is a cross-sectional view of the bottom cover assembly taken along line 16B—16B of FIG. 14.
Figure 16C:
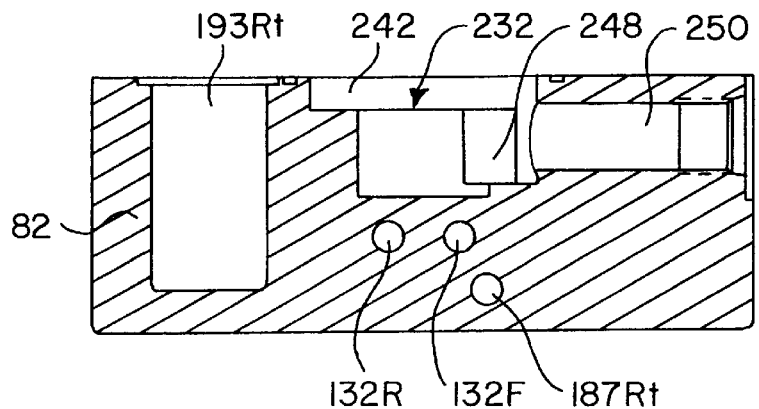
FIG. 16C is a cross-sectional view of the bottom cover assembly taken along line 16C—16C of FIG. 14.
Figure 17:
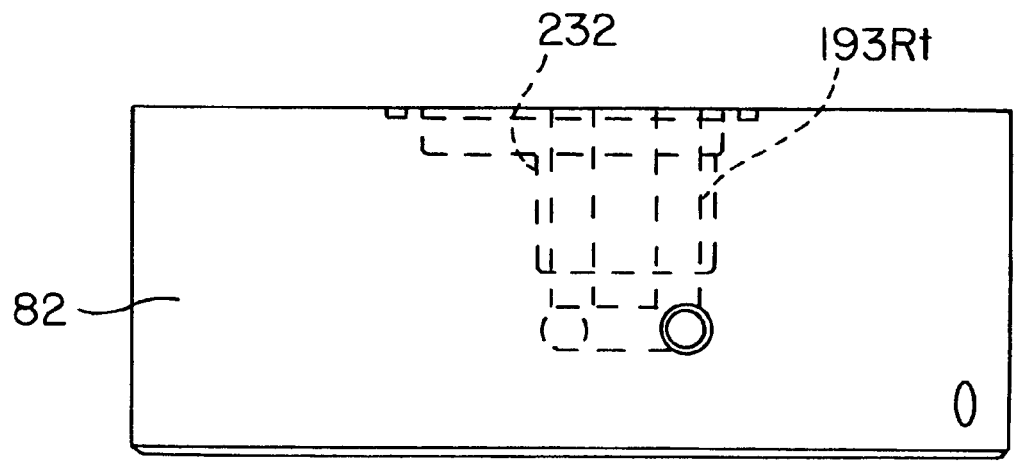
FIG. 17 is a side view of the bottom cover assembly as indicated by arrow 17 of FIG. 14.
Figure 18:
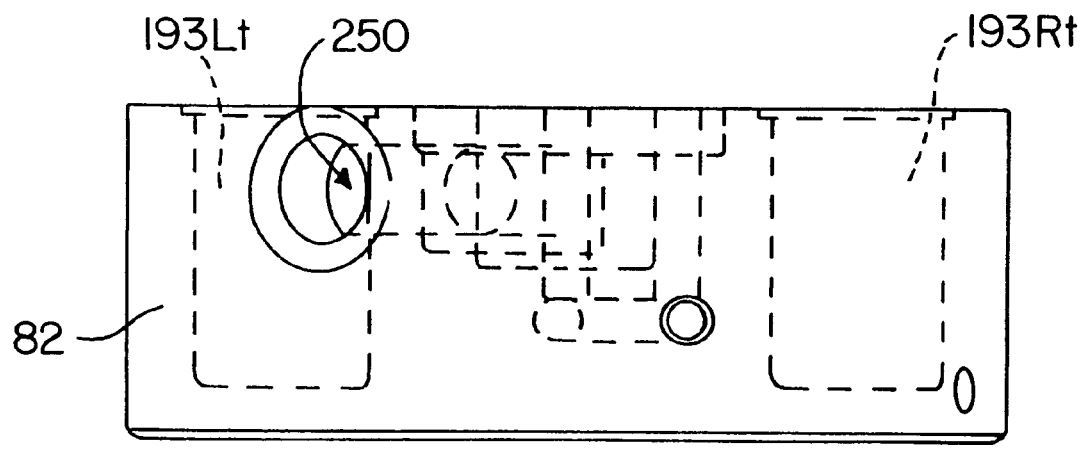
FIG. 18 is a rear view of the bottom cover assembly as indicated by arrow 18 of FIG. 14.

With reference to FIG. 13B, fluidically coupled to the left and tight brake ports L-B, R-B are respective horizontal passages 181Lt, 181Rt. The horizontal passages 181Lt, 181Rt are also fluidically coupled to respective vertical passages 183Lt, 183Rt which extend through the valve body 80. With reference to FIG. 14, the bottom cover assembly 82 has vertical passages 185Lt, 185Rt which are aligned and in fluid communication with the vertical passages 183LT, 183Rt, respectively, of the valve body 80. The vertical passages 185Lt, 185Rt are also in fluid in communication with the left and right bores 193Lt, 193Rt, respectively, in the bottom cover assembly 82. Accordingly, the left bore 193Lt is in fluid communication with the right brake port R-B, and the right bore 193Rt is in fluid communication with the left brake port L-B.

FIG. 7 shows the control lever 18 in a straight drive position where the vehicle may move in a straight direction (either forward or backward depending upon the forward or reverse position of the control lever). The springs 195Lt, 195Rt, 197Lt, 197Rt spring-bias the control lever 18 to the centered, upright position shown. With the control lever 18 in the straight drive position, the left and right brake outputs L-B, R-B are in fluid communication with the tank output T, and the left and right clutch outputs L-C, R-C are in fluid communication with the pressure supply input P (via the metering notches 199Rt in the right lower enlarged segment 198Rt). As discussed further above, the left brake and clutch outputs L-B, LC are fluidically coupled, respectively, to the brake and clutch ports 44 and 48 of the left steering cylinder 96 and the right brake and right clutch outputs R-B, R-C are fluidically coupled, respectively, to the brake and clutch ports 50, 54 of the right steering cylinder 52.

Movement of the control lever 18 to the left or right causes a corresponding movement of either the left or right steering spool 30Lt, 30Rt downward. The opposite steering spool does not move. For example, if the control lever 18 is moved to the right to effectuate a right turn, the right steering spool 30Rt is forced downward by the tilting cam ring 72. The right steering spool 30Rt in turn pushes the right washer 201Rt downward against the right inner spring 195Lt.

As the right steering spool 30Rt and right washer 201Rt continue to move downward, the washer 201Rt engages the top of the right spacer 203Rt and pushes the spacer 203Rt downward. The spacer 203Rt in turn compresses the right outer spring 197Rt which is pre-loaded.

As the right steering spool 30Rt moves downward, the right upper enlarged segment 194Rt moves to block the right upper radial passageway 170Rt so that the fight brake output R-B is no longer in fluid communication with the tank output T. Fluid communication is established between the right brake output R-B and the pressure supply input P via the metering notches 199Rt on the upper enlarged segment 194Rt. Furthermore, the right middle enlarged segment 196Rt moves to block the right middle radial passageway 176Rt so that the right clutch output R-C is no longer in fluid communication with the pressure supply input P. Fluid communication is established between the right clutch output RX and the tank output T (via the metering notches 199Rt in the lower enlarged segment 198Rt).

The right spacer 203Rt helps establish a clutch-brake "feel point" whereby the operator can sense at what point the pressure supply is diverted from the clutch output R-C to the brake output R-B. The clutch-brake "feel point" coincides with the point in the downward stroke of the right steering spool 30Rt when the spacer 203Rt engages the pre-loaded outer spring 195Rt At the "feel point", the operator experiences a significant increase in lever effort required to continue pushing the control lever 18 to the right.

As the right steering spool 30Rt moves downward, the left steering spool 30Lt does not move. When the control lever 18 is in the straight drive position, the steering spools 30Lt, 30Rt are forced into their uppermost positions by the inner springs 195Lt, 195Rt. The washers 201Lt, 201Rt prevent further movement of the steering spools 30Lt, 30Rt upward when the cam ring 72 is tilted to an opposite side.

The opposite occurs when the control lever 18 is tilted to the left in order to effectuate a left turn. For example, when the control lever 18 is tilted to the left, the left steering spool 30Lt moves downward and the right steering spool 30Rt remains in the straight position. As the left steering spool 30Lt moves downward, the pressure supply is diverted from the left clutch output L-C to the left brake output L-B.

Figure 8:
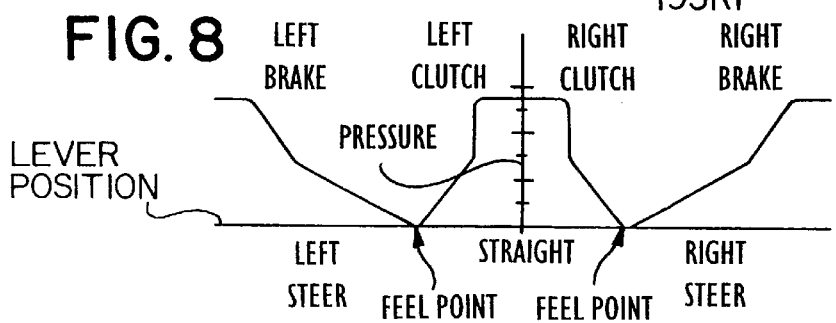
FIG. 8 is a graph illustrating the steering pressure levels of the left and right clutch outputs and brake outputs versus the steering position of the control lever.
Figure 9:
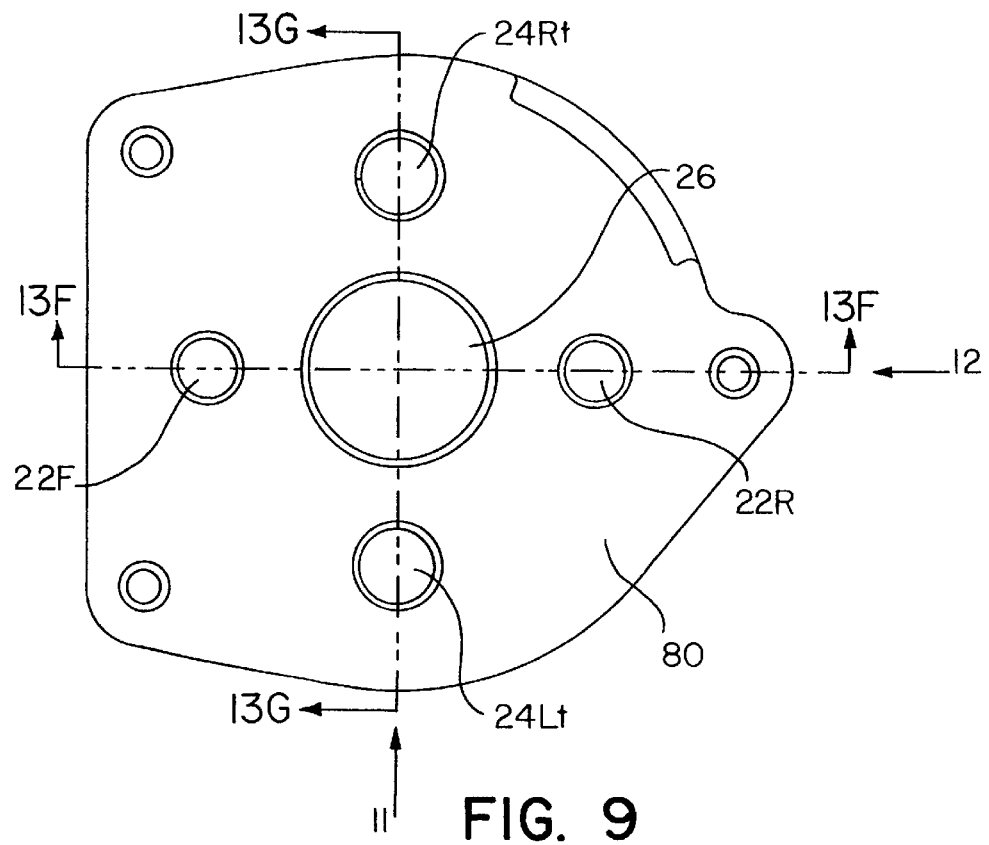
FIG. 9 is a top view of the upper valve housing of the valve body.
Figure 10:
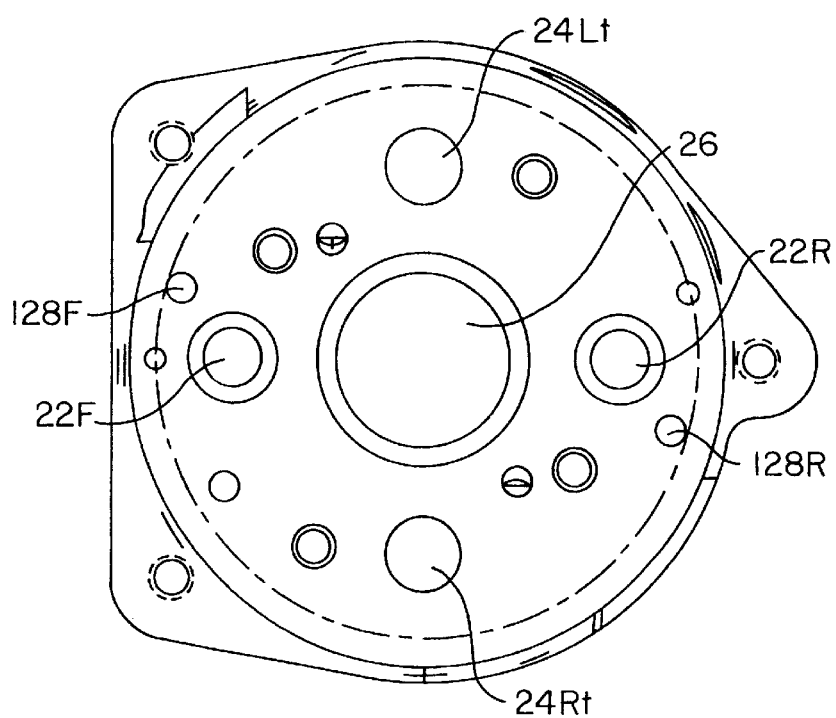
FIG. 10 is a bottom view of the upper valve housing of FIG. 9.
Figure 11:
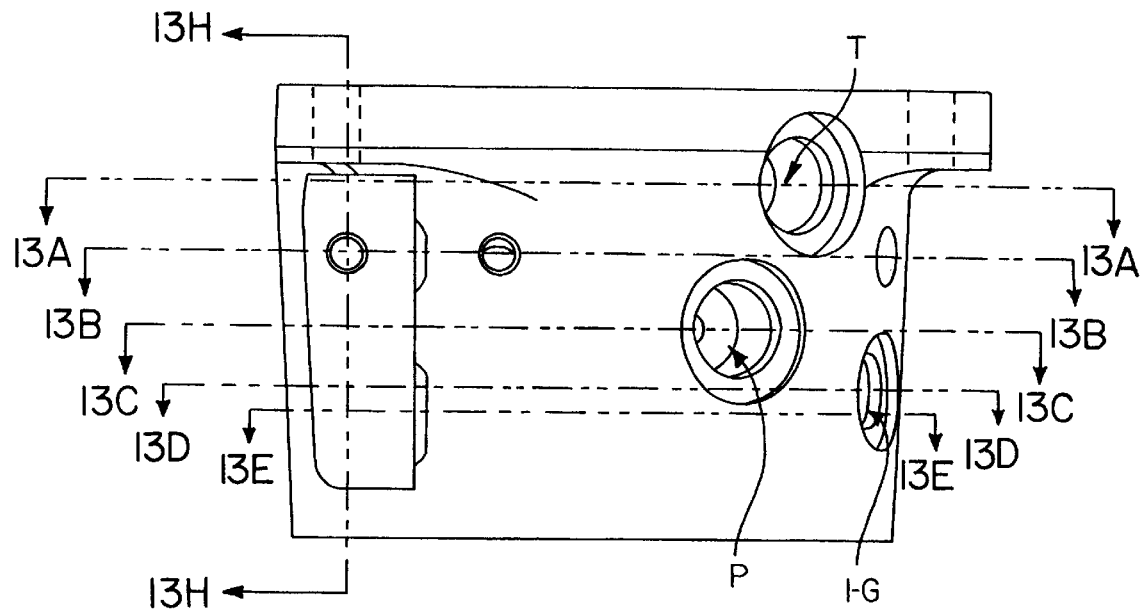
FIG. 11 is a side view of the upper valve housing as indicated by arrow 11 of FIG. 9.
Figure 12:
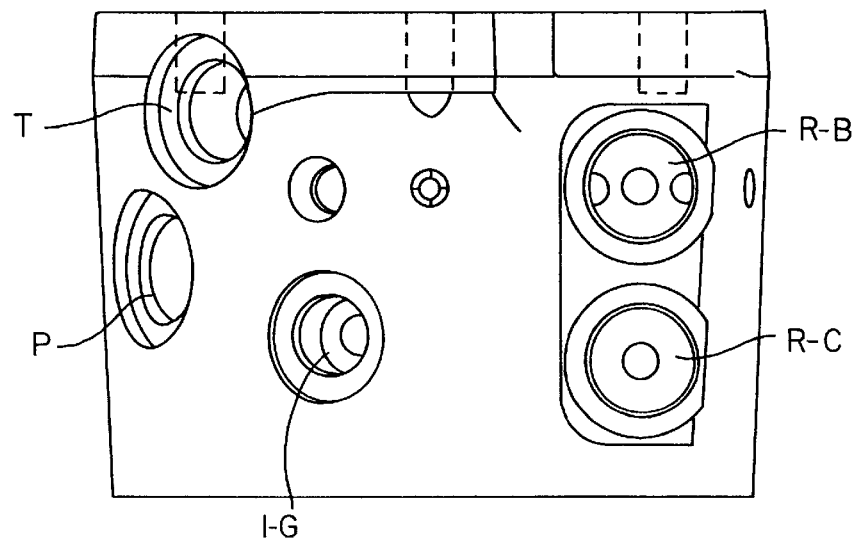
FIG. 12 is a rear view of the upper valve housing as indicated by arrow 12 of FIG. 9.

FIG. 8 is a graph illustrating the pressure levels for the left and right brake outputs L-B, R-B, and the left and right clutch outputs L-C, L-C based upon the position of the control lever 18. When the control lever 18 is in an upright position, corresponding to a straight drive steering of the vehicle, the left and right brake outputs L-B, R-B are fluidically connected to the tank output T, and the left and right clutch outputs L-C, R-C are fluidically connected to the pressure supply input P (approximately 270 PSI for crawler tractor). Accordingly, both the left and right clutches are engaged and power may be transmitted to the left and right tracks (or wheels) of the vehicle (provided the control handle 18 is in the forward or reverse position), and both the brakes L-B, L-B are disengaged.

As the control lever 18 is moved progressively to the left to the "feel point", the left brake output L-B remains connected to the tank output T. As the pressure source is cut off to the left clutch L-C and connection to the tank output T is made, the pressure level to the left clutch output L-C decreases until it reaches zero (and thereby the left clutch is disengaged). Once the level of pressure to the left clutch reaches zero and the control lever 18 is moved further to the left past the "feel point", the pressure level to the left brake output L-B increases to 270 PSI (and the left brake is thereby engaged). The left clutch remains at tank pressure. Power, accordingly, is no longer transmitted to the left track (or wheel) of the vehicle.

While the control lever 18 is moved to a left steer position, the right clutch remains engaged (i.e., the right clutch output R-C remains in fluid communication with the pressure supply input P). Furthermore, the right brake remains disengaged (i. e., the right brake output R-B remains in fluid communication with the tank output T). Power, accordingly, continues to be transmitted to the right track (or wheel) of the vehicle, and a turning of the vehicle to the left is effectuated.

The reverse occurs when the control lever 18 is moved to the right. In particular, the right clutch pressure level decreases to zero as the control lever 18 moves progressively to the right, thereby disengaging the right clutch, and the right brake pressure increases thereby engaging the right brake. The left clutch pressure level remains high so that the left clutch remains engaged, and the left brake pressure level remains zero. Power, accordingly, is diverted only to the left track (or wheel) of the vehicle, and the turning of the vehicle to the right is effectuated.

With reference to FIGS. 1, 11, 12, 13D, and 19–22B, the components and features associated with the gear selection will now be described. As described further above, the fifth center spool 32, or range selector spool, is used to make gear, or speed, selections and is connected to the control lever 18 by a universal joint 60. The universal joint 60 allows the control lever to pivot about two mutually perpendicular axes $Z_1$, $Z_2$ without effecting the position of the range selector spool 32 and to twist rotationally about the Y-axis (FIG. 21) in order to rotate the range selector spool 32 about the X-axis. The universal joint 60 is mounted to an upwardly-extending stem 200 at the top of the range selector spool 32.

As discussed above and with particular reference to FIG. 19, the range selector spool 32 has the three (upper, middle, and lower) indented segments 102, 112, 184 which help define the three circumferential passageways 96, 106, 182. In addition, the range selector spool 32 has three (upper, middle, and lower) radially-enlarged segments 202, 204, 206. The range selector spool 32 also has the central vertical drain hole 188 that extends from the upper indented segment 102 (which is fluidically connected to the tank output T (FIG. 13A) to the lower indented segment 184.

Figure 19:
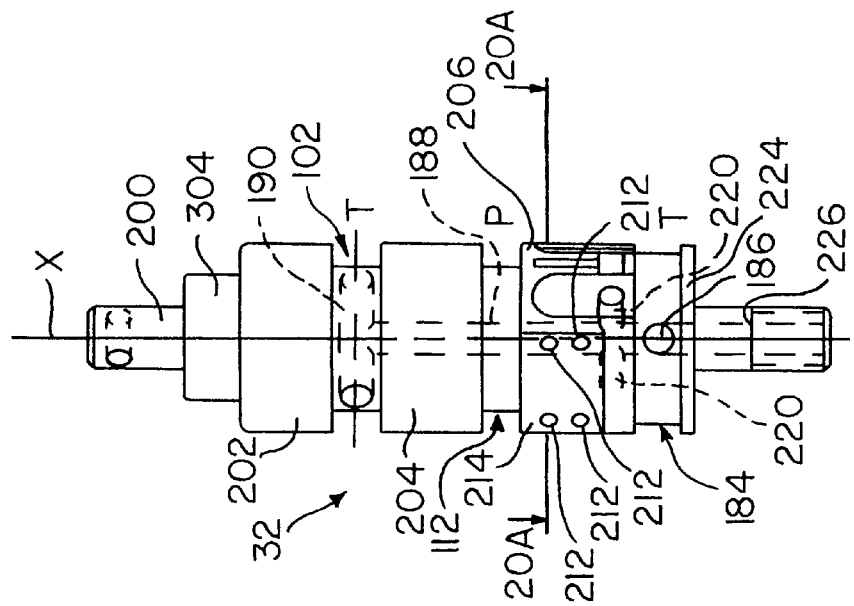
FIG. 19 is a side view of the range selector spool of the motion control valve and lever assembly of FIG. 1.
Figure 20A:
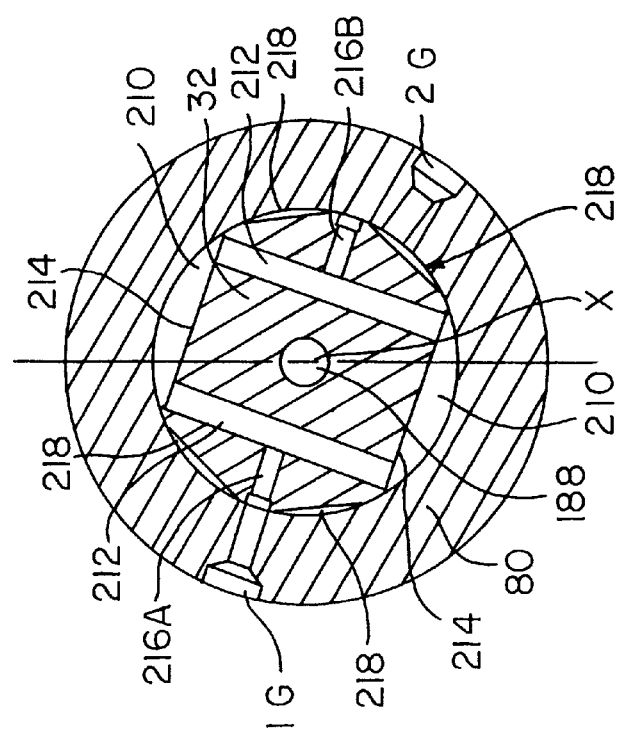
FIG. 20A is a cross-sectional view taken along line 20A—20A of FIG. 19 showing the range selector spool in a first gear position.

With reference to FIGS. 19–20C, the lower enlarged segment 206, or range selection segment, has a plurality of fluid passages which may be selectively connected to the two gear selection ports 1-G, 2-G disposed in the valve housing 80 adjacent the range selection segment 206 of the range selector spool 32. As shown in FIGS. 20A–20C, the gear selection ports 1-G, 2-G are preferably approximately 163° apart.

The fluid passages of the range selection segment 206 include: (a) a portion of the central drain hole 188; (b) two vertically-extending pressure feed cavities 210 on diametrically opposing sides of the spool; the cavities are defined by flattened outer areas 214 of the range selector spool 32; (c) four horizontally-extending through holes 212 which interconnect the two vertical pressure feed cavities 210; two of the horizontal holes 212 are on either side of the central drain hole 188, one above the other (only the upper horizontal holes 212 are shown in FIGS. 20A–20C; all four are shown in FIG. 19); (d) four radial holes 216A, 216B fluidically connected to respective horizontal holes 212; two of the radial holes 216A are on one side of the spool 32, one above the other, and the other two 216B are on the opposite side, one above the other (only the two upper holes 216A, 216B on either side of the spool 32 are shown in FIGS. 20A–20B); (e) four drain flats 218, one disposed on either side of the pairs of upper and lower radial holes 216A, 216B; and (f) four radial drain holes 220 (FIG. 19) located near the bottom of the range selection segment 206 that fluidically connect respective drain flats 218 with the central drain hole 188.

The vertical pressure feed cavities 210 are open on top to the middle indented segment 112 (and middle circumferential passageway 106) which as discussed further above and shown in FIG. 13C is fluidically connected to the pressure supply input P. Consequently, the vertical pressure feed cavities 210 and the connecting horizontal through holes 212 and radial holes 216A, 216B continually receive a source of hydraulic fluid under pressure from the pressure supply input P. The drain flats 218 are in continual fluid communication with the tank output T via the radial drain holes 220 that are connected to the central drain hole 188.

As shown in FIG. 1, the control lever 18, and correspondingly, the range selector spool 32 may be twisted into first, second, and third gear positions. As indicated in FIGS. 20A–20C, to the first and second gear positions of the range selector spool 32 are approximately 17° apart, and the second and third gear positions are approximately 17° apart.

As shown in FIG. 20A, when the range selector spool 32 is placed in the first gear position, the first radial holes 216A are aligned with the first gear selection port 1-G thereby allowing hydraulic fluid to flow from the pressure supply input P, out the first gear port 1-G, and to the first gear signal port 43A of the range selector valve 40 (FIG. 5). The range selector valve 40 in turn causes the vehicle's transmission to be placed in first gear. While the first radial holes 216A are aligned with the first gear port 1-G, the second radial holes 216B are blocked by the inner surface of the valve housing 80 so that fluid pressure is not fed to the second gear port 2-G. Rather, the second gear port 2-G is aligned with one of the drain flats 218 so that the second gear signal port 43B of the range selector valve 40 is at tank pressure.

As shown in FIG. 20B, when the range selector spool 32 is placed in the second gear position, the second radial holes 216B are aligned with the second gear selection port 2-G thereby allowing hydraulic fluid to flow from the pressure supply input P, out the second gear port 2-G, and to the second gear signal port 43B of the range selector valve 40 (FIG. 5). The range selector valve 40 in turn causes the vehicle's transmission to be placed in second gear. While the second radial holes 216B are aligned with the second gear port 2-G, the first radial holes 216A are blocked by the inner surface of the valve housing 80 so that fluid pressure is not fed to the first gear port 1-G. Rather, the first gear port 1-G is aligned with one of the drain flats 218 so that the first gear signal port 43A of the range selector valve 40 is at tank pressure.

As shown in FIG. 20C, when the range selector spool 32 is placed in the third gear position, both pairs of first and second radial holes 216A, 216B are blocked by the inner surface of the valve housing 80. Furthermore, both the first and second gear ports 1-G, 2-G are aligned with respective drain flats 218 thereby allowing hydraulic fluid to drain from first and second gear signal ports 43A, 43B of the range selector valve 40. When the both first and second gear signal ports 43A, 43B of the range selector valve 40 are at tank pressure, the flow of hydraulic fluid through the range selector valve 40 is such that the range selector valve 40 places the vehicle's transmission in third gear.

Figure 21:
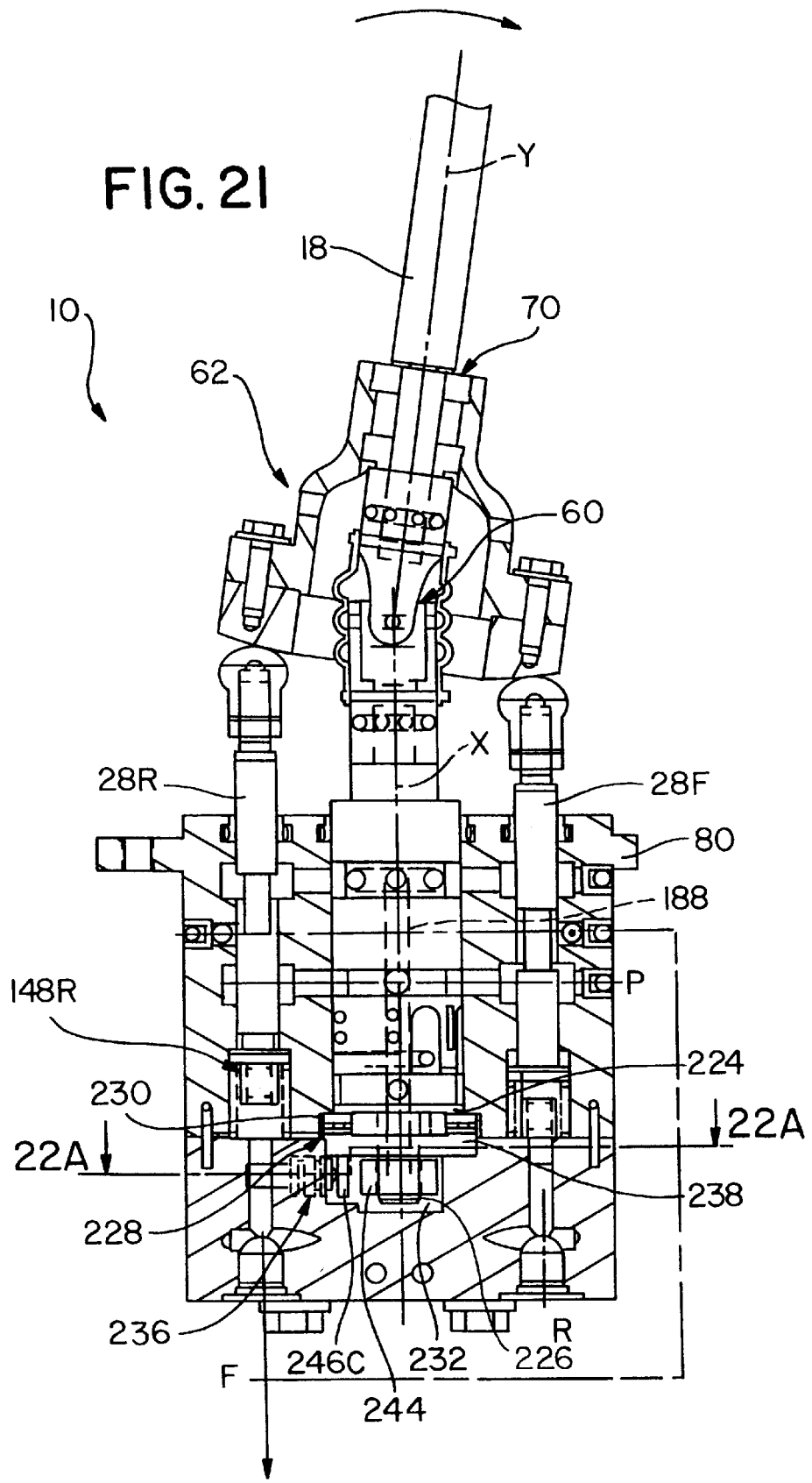
FIG. 21 is a side cross-sectional view of the motion control valve and lever assembly similar to FIG. 6 further illustrating a detent mechanism.

With reference to FIGS. 19 and 21, below the lower indented segment 184, the range selector spool 32 has a bearing plate 224 and a lower stem 226 which extends downward from the bearing plate 224. When the range selector spool 32 is placed in the central spool chamber 26 of the valve housing 80, the bearing plate 224 rests on a pair of circular needle thrust bearings 228 disposed near the bottom of the central spool chamber 26 in a counterbore 230. The lower stem 226 extends beyond the bottom of the valve housing 80 and into a central bore 232 located in the bottom cover assembly 82.

With reference to FIGS. 21, and 22A–C, coupled to the lower stem 226 and disposed in the bottom cover assembly 82 is a detent mechanism 236 which assists the operator to "feel" when the control lever 18 has been rotated into one of the three gear positions. The detent mechanism 236 includes a range cam 238 having a central through hole 240 through which the lower stem 226 of the range spool 32 extends. The range cam 238 has a flange portion 241 seated in a counterbore 242 of the bottom assembly's central bore 232. The needle thrust bearings 228 rest partially on top of the flange portion 241 of the range cam 238. A hex nut 244 is threaded onto the end of the lower stem 226 in order to hold the cam 238 on the lower stem 226.

Figure 22A:
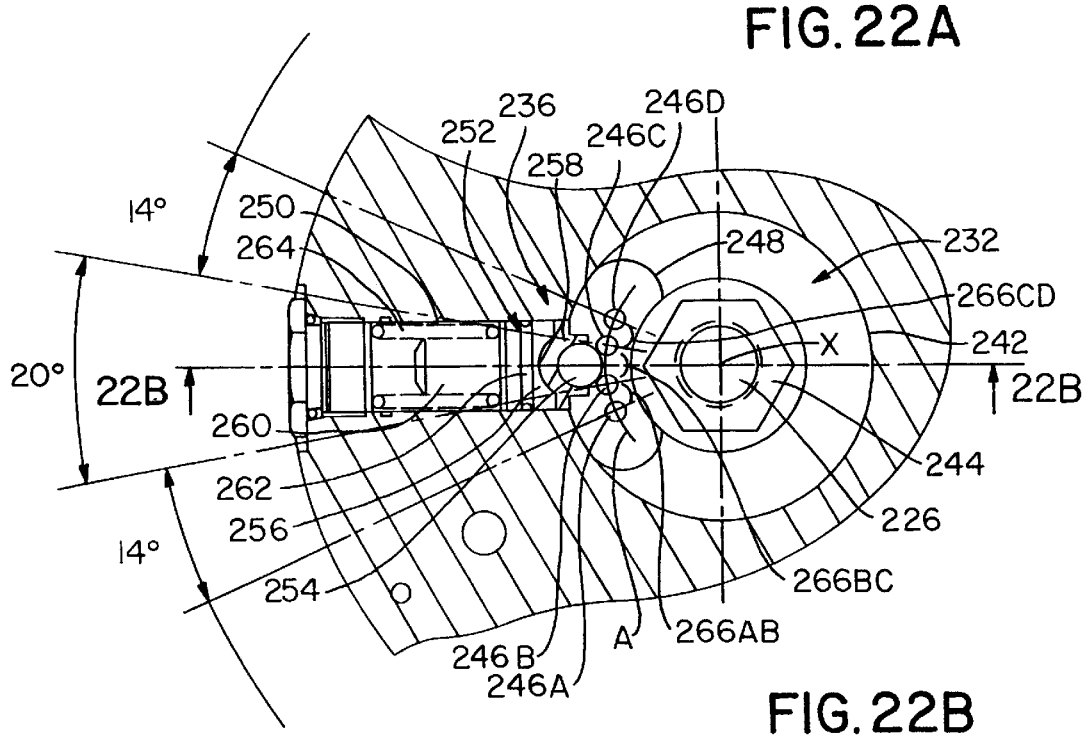
FIG. 22A is partial, top cross-sectional view of the bottom cover of the motion control valve and lever assembly taken along line 22A—22A of FIG. 21, illustrating the detent mechanism.
Figure 22B:
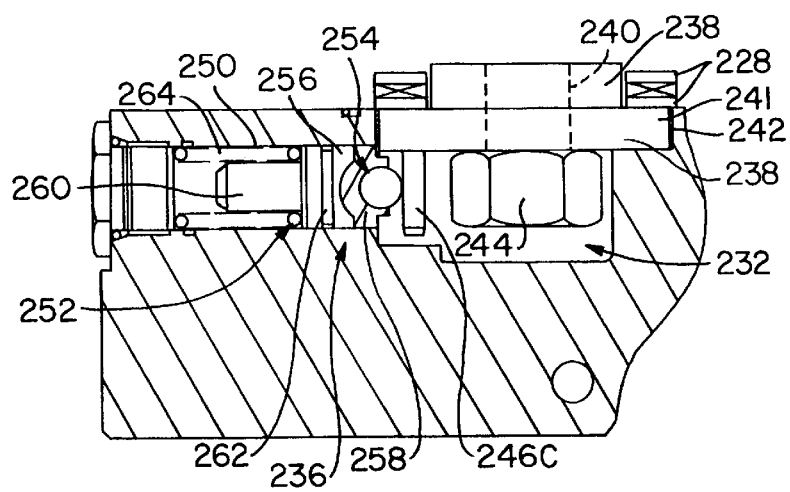
FIG. 22B is a partial, side cross-sectional view of the bottom cover of the motion control valve and lever assembly taken along line 22B—22B of FIG. 22A, illustrating the detent mechanism.

Mounted to the underside of the range cam 238 are four hardened dowel pins 246A, 246B, 246C, 246D which extend downward from the range cam 238 and define a catch assembly which, as described further below, "catches" or receives a steel ball 254 when the range selector spool 32 is rotated into one of the gear positions. As shown in FIG. 22A, the pins 246A–D are disposed along an arc A which forms a segment of a circle having the X axis at its center. The first pin 246A is located along the arc A approximately 14° from the second pin 246B; the second pin 246B is approximately 20° from the third pin 246C; and the third pin 246C is approximately 14° from the fourth pin 246D. The portion of the bore 232 in the bottom assembly that is below the counterbore 242 is enlarged on one side to form a pocket 248 for the pins 246A–D.

Connected to the bore 232 is a substantially horizontal passageway 250 in the bottom cover assembly 82. The horizontal passageway 250 holds a spring and ball assembly 252 which forms part of the detent mechanism 236. The spring and ball assembly 252 comprises a hardened steel ball 254 that is freely seated in a holder or detent guide spool 256. At the inward end of the detent guide spool 256 is a conical hole 258 for receiving the steel ball 254, and at the outward end is a spring guide stem 260. Between the conical hole 258 and the spring guide stem 260 is a section of the detent guide spool 256 that is provided with a circumferential balancing groove 262. The balancing groove 262 helps to center the detent guide spool 256 in the horizontal passageway 250 for low friction. Encircling the spring guide stem 260 of the detent guide spool 256 is a compression spring 264. The compression spring 264 biases the detent guide spool 256 and the steel ball 254 inward toward the dowel pins 246A-D. Between adjacent dowel pins 246A–D are gaps or detents 266AB, 266BC, 266CD which form troughs or ball seats in which the hardened ball 254 may be seated.

As discussed above, when the control lever 18 is rotated about its Y-axis into one of the gear positions, the range selector spool 32 correspondingly rotates about the X-axis. The range cam 238 also rotates with the range selector spool 32 causing either the second or third dowel pin 246B or 246C to brush past the steel ball 254 depending upon the position of the control lever 18. As one of the dowel pins 246B or 246C moves past the steel ball 254, it pushes the steel ball 254 radially outward against the bias of the spring 264. The spring 264 applies resistance to the rotating movement which the operator feels when the control lever 18 is turned. The resistance decreases once the dowel pin 246B or 246C moves past the steel ball 254 and the steel ball 254 is pressed by the spring 264 into one of the gaps or ball seats 266AB, 266BC, 266CD between the dowel pins. The decrease in resistance alerts the operator that the spool has reached one of the gear positions. The first 246A and fourth 246D pins will stop against the sides of the pocket 248 should the control lever 18 be rotated past the ball seats 266AB or 266CD.

When the steel ball 254 is seated in ball seat 266AB between the first and second dowel pins 246A, 246B, the range selection segment 206 of the range selector spool 32 is properly aligned so that the first gear port 1-G is in fluid communication with the pressure feed passages as shown in FIG. 20A. When the steel ball 254 is seated in ball seat 266BC between the second and third dowel pins 246B, 246C, the range selection segment 206 of the range selector spool 32 is properly aligned so that the second gear port 1-G is in fluid communication with the pressure feed passages of the range spool as shown in FIG. 20B. When the steel ball is seated in ball seat 266CD between the third and fourth dowel pins 246C, 246D, the range selection segment 206 of the range selector spool 32 is properly aligned so that both the first and second gear ports 1-G, 2-G are in fluid communication with the tank output T as shown in FIG. 20C.

Figure 22C:
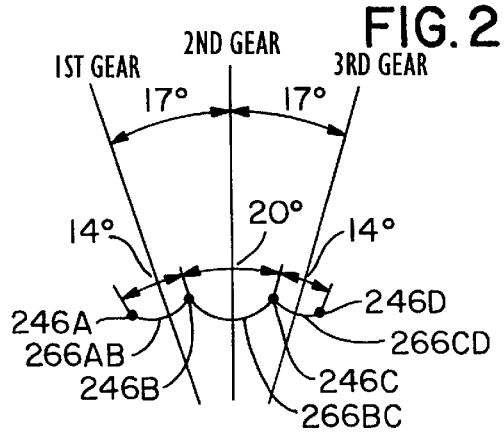
FIG. 22C is a diagram illustrating the relationship between the gear positions of the control lever and of the dowels pins of the detent mechanism.

FIG. 22C illustrates the relationship between the position of the control handle 18 and the position of the dowel pins 246A–D connected to the range selector spool 32. When the control handle 18 is in its first gear position, the steel ball 254 of the detent mechanism 236 is in the ball seat 266AB between the first and second dowel pins 246A, 246B. When the control handle 18 is moved 17° from first to second gear, the second dowel pin 246B moves past the steel ball 254 so that steel ball 254 becomes seated in the ball seat 266BC between the second and third dowel pins 246B, 246C. When the control lever 18 is moved 17° from the second gear position to the third gear position, the third dowel pin 246C moves past the steel ball 254 so that the steel ball 254 is seated in the ball seat 266CD between the third and fourth pins 246C, 246D.

Since the second and third dowel pins 246B, 246C are further apart (20° apart) than the first and second pins 246A, 246B (14° apart) and the third and fourth pins 246C, 246D (14° apart), the steel ball 254 sits deeper in the ball seat 266BC therebetween. From the second gear position, the control handle 18 may be twisted into first or third gear position. However, the detent effort required by the operator to move from second gear to first gear or from second gear to third gear is greater than the detent effort required to move from first to second gear or from third to second gear (due to the deeper seat of the middle ball seat 266BC). This discourages accidental shifting by the operator from first to third gear when first to second is intended (or third to first gear when third to second is intended).

Due to the direct correlation between the turning position of the range selector spool 32 and a selected gear, the range selector spool 32 can provide an accurate indication of which gear has been selected. FIGS. 23–25, and 26 and 27 illustrate first and second embodiments of gear selection displays which take advantage of the ability of the range spool 32 to provide an accurate indication of gear selection.

Figure 23:
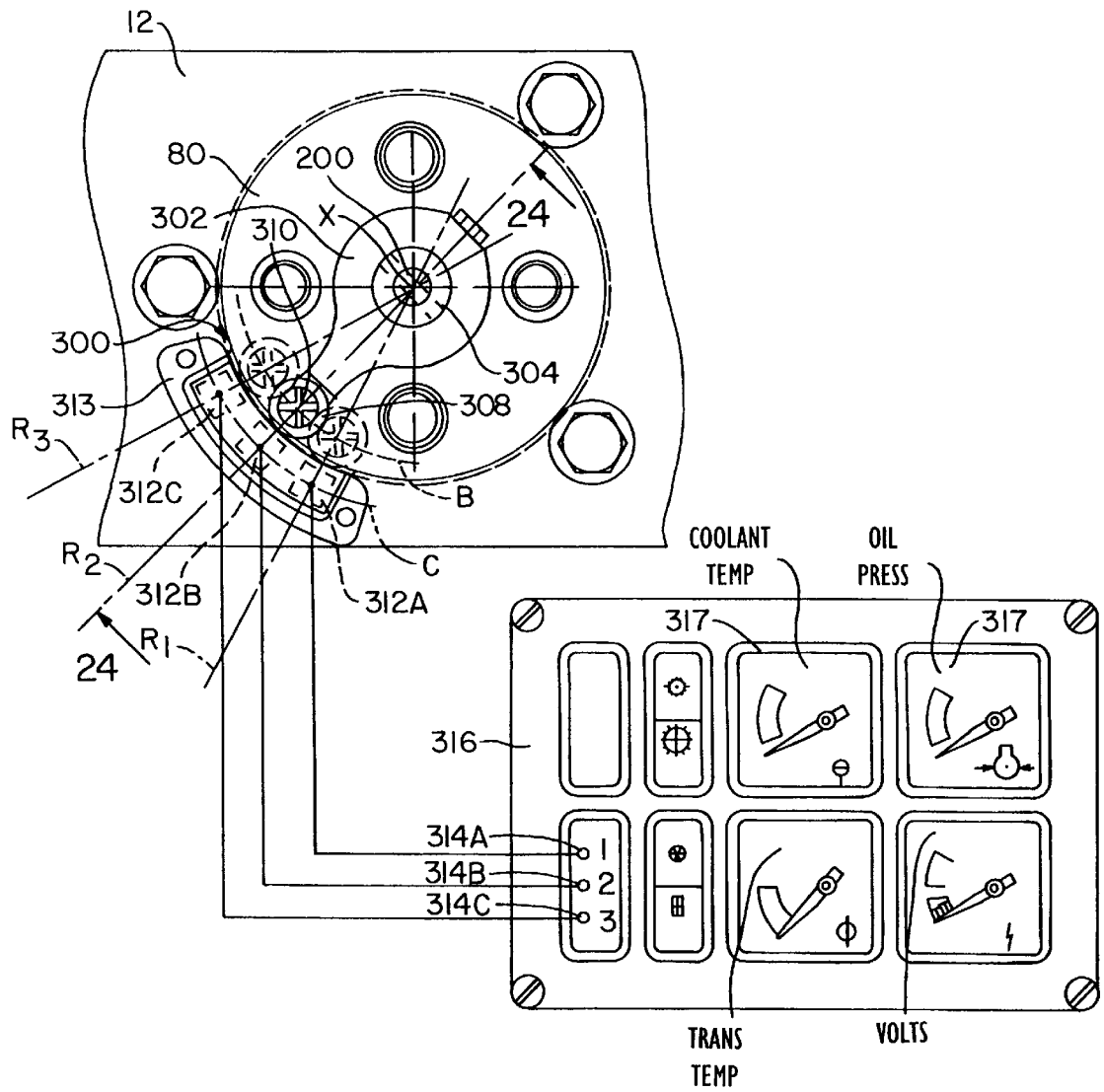
FIG. 23 is a system diagram of a first embodiment of a gear selection display assembly that is actuated by the control lever; shown is a top view of the motion control valve and lever assembly with a switch mechanism and an illustration of a remote display panel connected to the switch mechanism.
Figure 25:
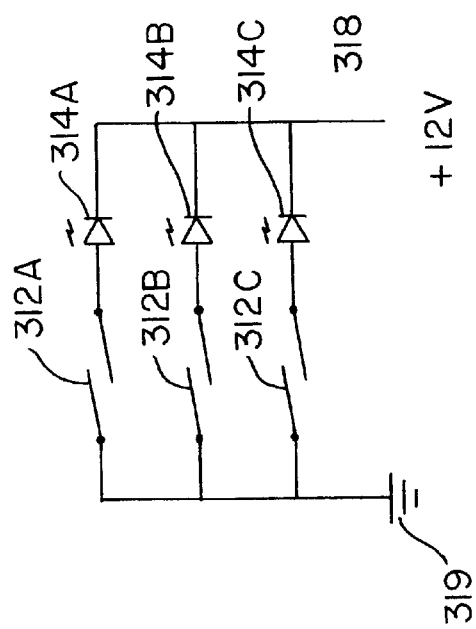
FIG. 25 is an electrical schematic of the switch mechanism circuit of the gear selection display assembly of FIG. 23.
Figure 24:
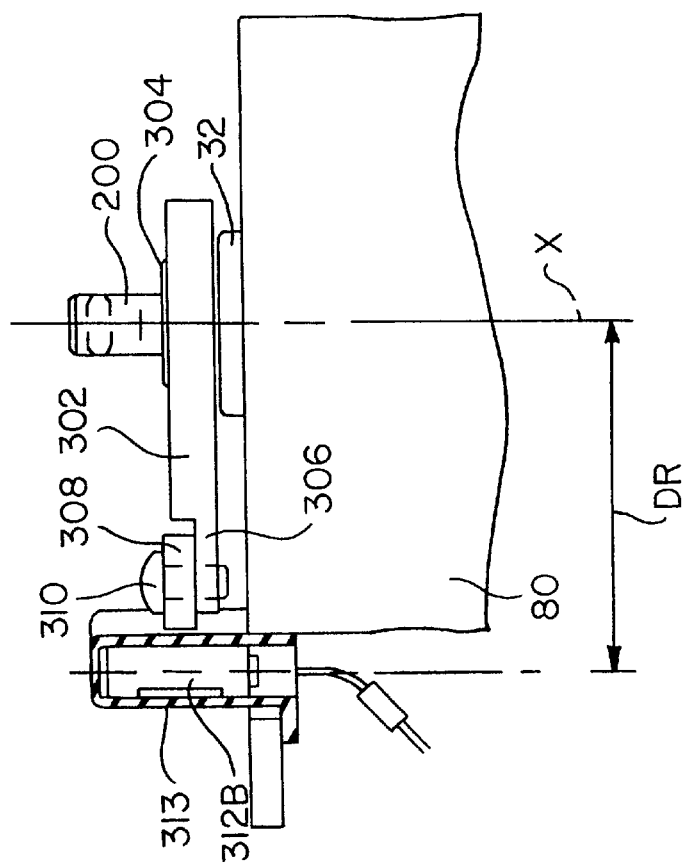
FIG. 24 is a side view of the switch mechanism of the gear selection display assembly of FIG. 23.

With reference to FIGS. 23–25 the first embodiment is an electrical gear selection display or indicator 300 that comprises an indicator arm 302 fixed to an upper segment 304 of the range selector spool 32 just below the upper stem 200. The indicator arm 302 is flat with a generally paddle-like configuration (as viewed from above). Attached to the end 306 of the indicator arm 302 is a magnet 308 that is held in place by a screw 310. When the range selector spool 32 rotates, the magnet 308 at the end 306 of the indicator arm 302 moves along an arc B as shown in FIG. 23. The arc B lies along a segment of a circle having the X-axis at its center.

Furthermore, the indicator arm 302 is attached to the range selector spool 32 so that the magnet 308 is: (1) aligned with a radial line $R_1$ extending from the X-axis when the range selector spool 32 is turned into first gear position, (2) aligned with a radial fine $R_2$ when the range selector spool is turned into second gear position, and (3) aligned with a radial line $R_3$ when the range selector spool is turned into third gear position. In the preferred embodiment, the first and second radial lines $R_1$ and $R_2$ are 17° apart and the second and third radial lines $R_2$ and $R_3$ are 17° apart.

A series of sealed reed switches 312A, 312B, 312C are positioned adjacent the end 306 of the indicator arm 302 along an arc C. The arc C lies along a segment of a circle having the X-axis at its center. Each of the reed switches 312A–C is an equal distance $D_R$ (FIG. 24) from the X-axis. Furthermore, the first reed switch 312A is substantially aligned with the first radial line $R_1$; the second reed switch 312A is substantially aligned with the second radial line $R_2$; and the third reed switch 312A is substantially aligned with the third radial line $R_3$.

The switches may be mounted to the console 12 and held in a protective case 313. Each of the reed switches 312A–B is electrically coupled to a respective LED (light-emitting-diode) display 314A, 314B, 314C positioned on a remote display panel 316 of the vehicle along with other indicators 317 as shown in FIG. 23. The LED displays 314A–C function as indicators of whether the transmission is in first, second, or third gear, respectively. With reference to FIG. 25 when one of the reed switches 312A, 312B, or 312C is triggered (closed), the switch completes a circuit between a voltage source 318 and ground 319, thereby activating the corresponding LED display 314A, 314B, or 314C.

When the control lever 18 is moved into first gear position, the range selector spool 32 is likewise moved into first gear position, and the indicator arm 302 moves so that the magnet 308 is actively aligned with the first reed switch 312A. The first reed switch 312A is thereby triggered (closed), and the first gear LED display 314A is activated. When the control lever 18 is moved into second gear position (as shown in FIG. 23), the range selector spool 32 is likewise moved into second gear position, and the indicator arm 302 moves so that the magnet 308 is actively aligned with the second reed switch 312B. The second reed switch 312B is thereby triggered (closed), and the second gear LED display 314B is activated. When the control lever 18 is moved into third gear position, the range selector spool 32 is likewise moved into third gear position, and the indicator arm 302 moves so that the magnet 308 is actively aligned with the third reed switch 312C. The third reed switch 312C is thereby triggered (closed), and the third gear LED display 314C is activated. Accordingly, the operator can determine which gear the transmission is placed in by seeing which LED display is lit.

Figure 26:
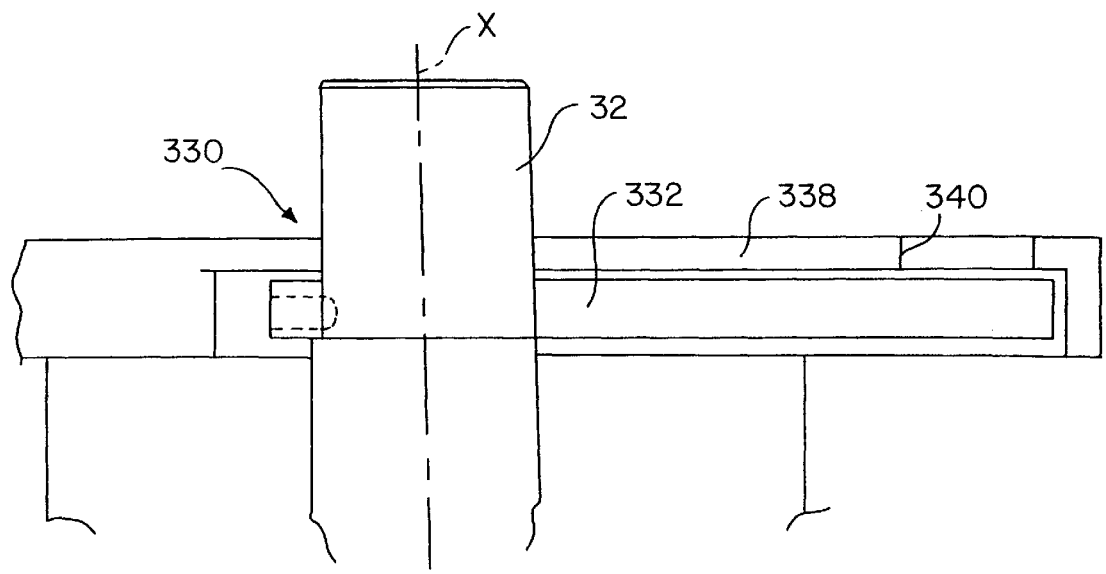
FIG. 26 is a side view of a second embodiment of a gear selection display assembly.
Figure 27:
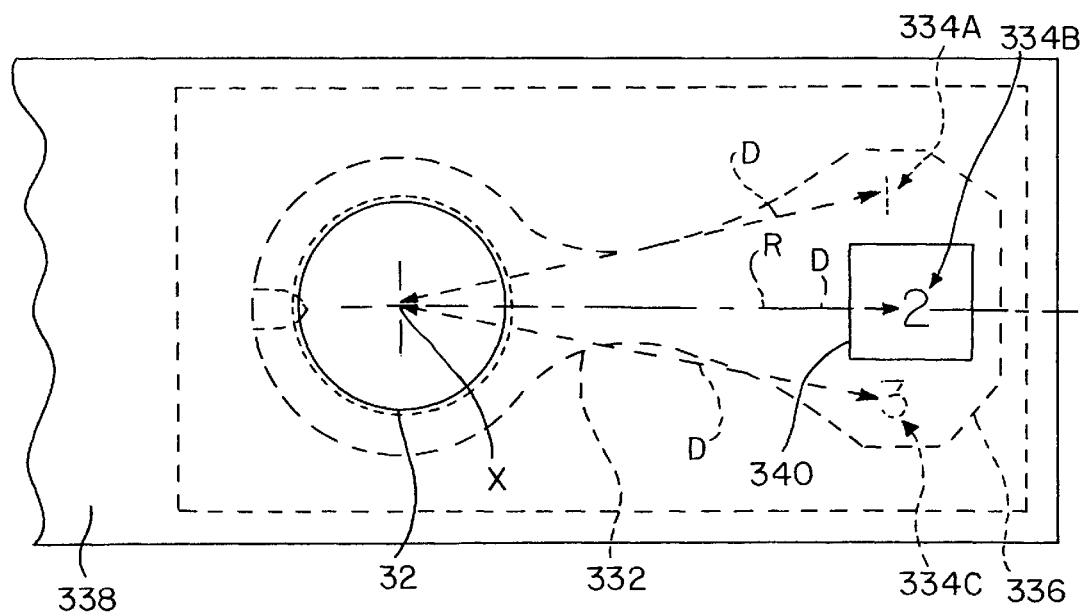
FIG. 27 is a top view of the gear selection display assembly of FIG. 26.

FIGS. 26 and 27 illustrate a second embodiment of a non-electronic gear selection display or indicator 330. The non-electronic indicator 330 comprises an indicator arm 332 attached to the range selector spool 32. The indicator arm 332 is flat with gear numbers 334A, 334B, 334C or other indicia representative off first, second, and third gear, respectively, imprinted or otherwise placed on the distal end 336 of the arm 332 as shown in FIG.27. The gear numbers 334A–C are positioned an equidistance D from the X-axis (center of range selector spool 32). Furthermore, the first gear number 334A is preferably approximately 17° from the second gear number 334B, and the second gear number 334B is preferably approximately 17° from the third gear number 334C as shown in FIG. 27.

The indicator arm 332 is attached to the range selector spool 32 so that a corresponding gear number 334A, 334B, or 334C is substantially aligned with a radial line R extending outwardly from the X-axis (center of the range selector spool 32) when the range selector spool 32 is moved into first, second, or third gear position. For example, when the range selector spool 32 is moved into second gear, the gear number 334B representative of second gear is substantially aligned with the radial line R as shown in FIG. 27. Likewise, if the range selector spool 32 is in first gear position, the first gear number 334A is substantially aligned with the radial line R, and if the range selector spool 32 is in third gear, the third gear number 334C is substantially aligned with the radial line R.

A cover 338 having a window 340 is positioned over the indicator are 332 so that the window 340 is substantially aligned with the radial line R and is substantially an equal distance D from the center of the range selector spool 32 as are the gear numbers 334A–C. The window 340 is preferably sized so that when a particular gear number 334A, 334B, or 334C is aligned with the radial line R, that number shows through the window 340. In FIG. 27 for example, the second gear number 334B is aligned with the radial line R and shows through the window 340. Accordingly, the operator can determine which gear the transmission is placed in by looking at the window 340.

While only one embodiment of the invention has been shown and described, it should be recognized that other variations, substitutions, or modifications will occur to those skilled in the art.

What is claimed is:

1. A motion control valve and lever assembly, comprising:
   a valve assembly comprising:
      a valve body having a plurality of signal ports and first, second, and third spool chambers; and
      three independent valve spools comprising a first valve spool movably mounted in said first spool chamber, a second valve spool slidably mounted in said second spool chamber, and a third valve spool slidably mounted in said third spool chamber, said first, second, and third valve spools each having a first end and a second opposing end;
   a control lever pivotally mounted to said first valve spool such that said control lever may pivot about a first axis with respect to said first valve spool; and
   a cam assembly rotationally coupled to said control lever such that said control lever is free to rotate axially about a first longitudinal axis of said control lever;
   wherein said cam assembly comprises a cam that is positioned adjacent said first ends of said second and third valve spools, whereby said cam may operatively engage said first ends of said second and third valve spools when said control lever is selectively pivoted about said first axis; and
   wherein rotation of said control lever about said first longitudinal axis causes a corresponding axial rotation of said first valve spool about a second longitudinal axis of said first valve spool.

2. The motion control valve and lever assembly of claim 1, wherein said cam assembly further comprises:
   a cam bracket mounted to said cam, said cam bracket having an inner surface that surrounds a portion of said control lever, and
   at least one bearing engagingly disposed between said inner surface of said cam bracket and said control lever.

3. The motion control valve and lever assembly of claim 1, wherein said first valve spool is a range selector spool that may be rotated about said second longitudinal axis into a plurality of different operative positions when said control lever is selectively rotated about said first longitudinal axis.

4. The motion control valve and lever assembly of claim 3, wherein said valve assembly further comprises a detent mechanism coupled to said range selector spool.

5. The motion control valve and lever assembly of claim 4, wherein said detent mechanism comprises:
   a guide spool disposed in a guide spool chamber provided in said valve body;
   a detent ball seated at an end of said guide spool;
   a plurality of pins mounted to said range selector spool adjacent said guide spool such that a plurality of detent ball seats are formed respectively between adjacent pins at predetermined intervals; and
   a spring biasingly coupled to said guide spool such that said detent ball is biased toward said pins;
   wherein when said range selector spool is rotated about said second longitudinal axis by said control lever, said pins move with said range selector spool and engage said detent ball against the bias of said spring, and when said range selector spool is rotated into one of said operative positions, said detent ball is received in a respective one of said detent ball seats.

6. The motion control valve and lever assembly of claim 4, wherein said detent mechanism comprises:
   a spring and ball assembly mounted to said valve body adjacent said range selector spool, said spring and ball assembly comprising a ball and a spring that biases said ball toward said range selector spool; and
   a catch assembly mounted to said range selector spool adjacent said spring and ball assembly such that said catch assembly rotates with said range selector spool when said range selector spool is rotated about said second axis, said catch assembly having a plurality of ball seats spaced apart at predetermined intervals;
   wherein said ball is selectively received in a respective one of said ball seats when said range selector spool is rotated into one of said operative positions.

7. The motion control valve and lever assembly of claim 3, further comprising a range selector display assembly coupled to said range selector spool.

8. The motion control valve and lever assembly of claim 7, wherein said range selector display assembly comprises:
   an indicator arm mounted to said range selector spool such that said indicator arm extends outwardly from said range selector spool and rotates with said range selector spool when said range selector spool rotates about said second axis;

a plurality of display indicia positioned on said indicator arm at predetermined intervals and corresponding to respective ones of said operative positions of said range selector spool; and a cover positioned over said indicator arm in the region of said display indicia, said cover having a window;

wherein a respective said display indicia is aligned with said window of said cover when said range selector spool is rotated into one of said operative positions.

9. The motion control valve and lever assembly of claim 7, wherein said range selector display comprises:

an indicator arm mounted to said range selector spool such that said indicator arm extends outwardly from said range selector spool;

a switch trigger mounted to a distal end of said indicator arm;

a plurality of switches corresponding to respective ones of said operative positions of said range selector spool, said plurality of switches being positioned adjacent said distal end of said indicator arm; and a plurality of displays operatively coupled to respective ones of said switches;

wherein rotation of said range selector valve about said second longitudinal axis into one of said operative positions causes a corresponding rotation of said indicator arm about said second longitudinal axis so that said switch trigger is in triggering alignment with a corresponding one of said switches and said corresponding one of said switches activates said respective display.

10. The motion control valve and lever assembly of claim 9, wherein said switch trigger comprises a magnet and said plurality of switches comprise a plurality of reed switches.

11. The motion control valve and lever assembly of claim 9, wherein said displays comprise light-emitting diodes.

12. The motion control valve and lever assembly of claim 7, wherein said range selector display assembly comprises:

an indicator arm mounted to said range selector spool such that said indicator arm extends outwardly from said range selector spool and rotates with said range selector spool when said range selector spool rotates about said second axis;

a plurality of display indicia corresponding to respective ones of said operative positions of said range selector spool, said display indicia being positioned at predetermined intervals on said indicator arm or adjacent said indicator arm; and an indicia pointer disposed on the other of either said indicator arm or adjacent said distal end of said indicator arm;

wherein a respective said display indicia is aligned with said indicia pointer when said range selector spool is rotated into one of said operative positions.

13. The motion control valve and lever assembly of claim 12, wherein said display indicia is positioned on said indicator arm near said distal end and said indicia pointer comprises a cover positioned over said indicator arm in the region of said display indica, said cover having a window that is aligned with a respective said display indicia when said range selector spool is rotated into one of said operative positions.

14. The motion control valve and lever assembly of claim 1, wherein said second spool chamber has a first end, a second end and a subchamber near said second end, and said second end of said second valve spool terminates in said second subchamber;

wherein said third spool chamber has a first end, a second end and a subchamber near said second end, and said second end of said third valve spool terminates in said second subchamber;

wherein said valve body further has:

a first passage fluidically coupling said second spool chamber with a first said signal port;

a second passage fluidically coupling said subchamber of said second spool chamber with a second said signal port;

a third passage fluidically coupling said third spool chamber with said second signal port;

a fourth passage fluidically coupling said subchamber of said third spool chamber with said first signal port;

a pressure feed port through which pressurized fluid may be introduced into said valve body;

a reservoir port through which fluid may exit said valve body;

a fifth passage fluidically coupling said second spool chamber and said pressure feed port;

a sixth passage fluidically coupling said second spool chamber and said reservoir port;

a seventh passage fluidically coupling said third spool chamber and said pressure feed port; and an eighth passage fluidically coupling said third spool chamber and said reservoir port; and wherein, when said control lever is pivoted in a first direction about said first axis, said cam engages said first end of said second valve spool and presses said second valve spool into a first position whereby said second valve spool allows fluid communication between said pressure feed port, said second spool chamber, and said first signal port, and whereby fluid flowing from said pressure feed port to said first signal port enters said subchamber of said third spool chamber through said fourth passage and forces said third valve spool toward said cam into a first position thereby forming a hydraulic detent that holds said third valve spool in said first position, said third valve spool allowing fluid communication between said second signal port and said reservoir port when in said first position.

15. The motion control valve and lever assembly of claim 14, wherein, when said control lever is pivoted in a second direction about said first axis, said cam engages said first end of said third valve spool and presses said third valve spool into a second position whereby said third valve spool allows fluid communication between said pressure feed port, said third spool chamber, and said second signal port, and whereby fluid flowing from said pressure feed port to said second signal port enters said subchamber of said second spool chamber through said second passage and forces said second valve spool toward said cam into a second position thereby forming a hydraulic detent that holds said second valve spool in said second position, said second valve spool allowing fluid communication between said first signal port and said reservoir port when in said second position.

16. The motion control valve and lever assembly of claim 15, wherein said valve assembly further comprises stop nuts mounted to said second ends of said second and third valve spools, wherein said stop nuts check the movement of said second and third valve spools under the force of said hydraulic detents.

17. The motion control valve and lever assembly of claim 14, wherein said valve assembly further comprises a first spring positioned in said subchamber of said second spool chamber such that said first spring biases said second valve spool toward said cam, and a second spring positioned in said subchamber of said third spool chamber such that said second spring biases said third valve spool toward said cam.

18. The motion control valve and lever assembly of claim 14, wherein said first signal port is a forward drive port and said second signal port is reverse drive port.

19. The motion control valve and lever assembly of claim 1, wherein when said control lever is pivoted in a first direction about said first axis, said cam engages said first end of said second valve spool and presses said second valve spool into a first operative position and when said control lever is pivoted in a second direction about said first axis, said cam engages said first end of said third valve spool and presses said third valve spool into a first position; and wherein said valve assembly further comprises a first hydraulic detent operatively coupled to said second valve spool to hold said second valve spool in a second position when said third valve spool is pressed into its first position by said cam, and a second hydraulic detent operatively coupled to said third valve spool to hold said third valve spool in a second position when said second valve spool is pressed into its first position by said cam.

20. The motion control valve and lever assembly of claim 1, wherein said valve body further has:
        a pressure feed port through which pressurized fluid may be introduced into said valve body,
        a reservoir port through which fluid may exit said valve body, and
        a plurality of passages interconnecting said second and third spool chambers with said pressure feed port, said reservoir port and a first said signal port and a second said signal port;

wherein when said control lever is pivoted in a first direction about said first axis, said cam engages said first end of said second valve spool and presses said second valve spool into a first operative position and when said control lever is pivoted in a second direction about said first axis, said cam engages said first end of said third valve spool and presses said third valve spool into a first operative position; and wherein said valve assembly further comprises first hydraulic detent means operatively coupled to said second valve spool for producing a first hydraulic detent that presses said second valve spool towards said cam when said third valve spool is pressed into its said first operative position by said cam, and a second hydraulic detent means operatively coupled to said third valve spool for producing a second hydraulic detent that presses said third valve spool towards said cam when said second valve spool is pressed into its said first operative position by said cam.

21. The motion control valve and lever assembly of claim 1, wherein said signal ports include a left brake port, a left clutch port, a right brake port, and a right clutch port;
    wherein said second spool chamber has a first end, a second end and a subchamber near said second end, and said second end of said second valve spool terminates in said second subchamber;
    wherein said third spool chamber has a first end, a second end and a subchamber near said second end, and said second end of said third valve spool terminates in said second subchamber;

wherein said valve body further has:
        a pressure feed port through which pressurized fluid may be introduced into said valve body;
        a reservoir port through which fluid may exit said valve body;
        a first passage fluidically coupling said second spool chamber and said left brake port;
        a second passage fluidically coupling said second spool chamber and said left clutch port;
        a third passage fluidically coupling said second spool chamber and said pressure feed port;
        a fourth passage fluidically coupling said second spool chamber and said reservoir port;
        a fifth passage fluidically coupling said subchamber of said second spool chamber and said right brake port;
        a sixth passage fluidically coupling said third spool chamber and said right brake port;
        a seventh passage fluidically coupling said third spool chamber and said right clutch port;
        an eighth passage fluidically coupling said third spool chamber and said pressure feed port;
        a ninth passage fluidically coupling said third spool chamber and said reservoir port; and
        a tenth passage fluidically coupling said subchamber of said third spool chamber and said left brake port;

wherein each said subchamber of said second and third spool chambers is provided with a spring that respectively biases said second and third valve spools toward said cam;

wherein said control lever may be pivoted about said first axis into a left steering position, an opposing right steering position, and a straight drive position between said left and right steering positions;

wherein when said control lever is in said straight drive position, said left and right brake ports are in fluid communication with said tank port and said left and right clutch outputs are in fluid communication with said pressure supply;

wherein as said control lever is moved toward said left steering position from said straight drive position, said cam engages said first end of said second valve spool and presses said second valve spool such that fluid communication between said left brake port and said reservoir port is stopped and is established between said left brake port and said pressure feed port, and fluid communication between said left clutch port and said pressure feed port is stopped and established between said left clutch port and said reservoir port; and wherein as said control lever is moved toward said right steering position from said straight drive position, said cam engages said first end of said third valve spool and presses said third valve spool such that fluid communication between said right brake port and said reservoir port is stopped and is established between said right brake port and said pressure feed port, and fluid communication between said right clutch port and said pressure feed port is stopped and established between said right clutch port and said reservoir port.

22. The motion control valve and lever assembly of claim 1, wherein said valve body further has fourth and fifth spool chambers; and
    wherein said valve assembly further comprises:
        a fourth valve spool slidably mounted in said fourth spool chamber, a fifth valve spool slidably mounted in said fifth spool chamber, and a pivot interconnecting said control lever and said first valve spool such that said control lever is pivotable about said first axis and about a second axis with respect to said first valve spool; and wherein said second, third, fourth, and fifth valve spools are positioned about said first valve spool such that said second and third valve spools are on opposite sides of said first valve spool and said fourth and fifth valve spool are opposite sides of said first valve spool.

23. The motion control valve and lever assembly of claim 22, wherein said signal ports include a forward drive port, a reverse drive port, a left brake port a left clutch port, a right brake port a right clutch port, a first gear port and a second gear port;

wherein said first valve spool is a range selector spool said second and third valve spools are a forward signal spool and a reverse signal spool respectively, and said fourth and fifth valve spools are a left steering spool and a right steering spool, respectively; and wherein said valve body further has:
a pressure feed port through which pressurized fluid may be introduced into said valve body,
a reservoir port through which fluid may exit said valve body, and
a plurality of passages fluidically coupling said signal ports, pressure feed port, and reservoir port with said spool chambers.

24. A motion control valve and lever assembly, comprising:

a valve assembly comprising:
a valve body having a plurality of signal ports and first, second, and third spool chambers; and
a first valve spool movably mounted in said first spool chamber, a second valve spool slidably mounted in said second spool chamber, and a third valve spool slidably mounted in said third spool chamber, said first, second, and third valve spools each having a first end and a second opposing end;

a control lever pivotally mounted to said first valve spool such that said control lever may pivot about a first axis with respect to said first valve spool; and a cam assembly rotationally coupled to said control lever such that said control lever is free to rotate axially about a first longitudinal axis of said control lever;

wherein said cam assembly comprises:
a cam that is positioned adjacent said first ends of said second and third valve spools, whereby said cam may operatively engage said first ends of said second and third valve spools when said control lever is selectively pivoted about said first axis,
a cam bracket mounted to said cam, said cam bracket having an inner surface that surrounds a portion of said control lever, and
at least one bearing engagingly disposed between said inner surface of said cam bracket and said control lever; and wherein rotation of said control lever about said first longitudinal axis causes a corresponding axial rotation of said first valve spool about a second longitudinal axis of said first valve spool.

25. A motion control valve and lever assembly, comprising:

a valve assembly comprising:
a valve body having a plurality of signal ports and first, second, and third spool chambers; and
a first valve spool movably mounted in said first spool chamber, a second valve spool slidably mounted in said second spool chamber, and a third valve spool slidably mounted in said third spool chamber, said first, second, and third valve spools each having a first end and a second opposing end;

a control lever pivotally mounted to said first valve spool such that said control lever may pivot about a first axis with respect to said first valve spool; and a cam assembly rotationally coupled to said control lever such that said control lever is free to rotate axially about a first longitudinal axis of said control lever;

wherein said cam assembly comprises a cam that is positioned adjacent said first ends of said second and third valve spools, whereby said cam may operatively engage said first ends of said second and third valve spools when said control lever is selectively pivoted about said first axis;

wherein rotation of said control lever about said first longitudinal axis causes a corresponding axial rotation of said first valve spool about a second longitudinal axis of said first valve spool; and wherein said first valve spool is a range selector spool that may be rotated about said second longitudinal axis into a plurality of different operative positions when said control lever is selectively rotated about said first longitudinal axis.

26. The motion control valve and lever assembly of claim 25, wherein said valve assembly further comprises a detent mechanism coupled to said range selector spool.

27. A motion control valve and lever assembly, comprising:

a valve assembly comprising:
a valve body having a plurality of signal ports and first, second, and third spool chambers; and
a first valve spool movably mounted in said first spool chamber, a second valve spool slidably mounted in said second spool chamber, and a third valve spool slidably mounted in said third spool chamber, said first, second, and third valve spools each having a first end and a second opposing end;

a control lever pivotally mounted to said first valve spool such that said control lever may pivot about a first axis with respect to said first valve spool; and a cam assembly rotationally coupled to said control lever such that said control lever is free to rotate axially about a first longitudinal axis of said control lever;

wherein said cam assembly comprises a cam that is positioned adjacent said first ends of said second and third valve spools, whereby said cam may operatively engage said first ends of said second and third valve spools when said control lever is selectively pivoted about said first axis;

wherein rotation of said control lever about said first longitudinal axis causes a corresponding axial rotation of said first valve spool about a second longitudinal axis of said first valve spool;

wherein when said control lever is pivoted in a first direction about said first axis, said cam engages said first end of said second valve spool and presses said second valve spool into a first operative position and when said control lever is pivoted in a second direction about said first axis, said cam engages said first end of said third valve spool and presses said third valve spool into a first position; and wherein said valve assembly further comprises a first hydraulic detent operatively coupled to said second valve spool to hold said second valve spool in a second position when said third valve spool is pressed into its first position by said cam, and a second hydraulic detent operatively coupled to said third valve spool to hold said third valve spool in a second position when said second valve spool is pressed into its first position by said cam.

28. A motion control valve and lever assembly, comprising:

a valve assembly comprising:
 a valve body having a plurality of signal ports and first, second, and third spool chambers; and
 a first valve spool movably mounted in said first spool chamber, a second valve spool slidably mounted in said second spool chamber, and a third valve spool slidably mounted in said third spool chamber, said first, second, and third valve spools each having a first end and a second opposing end;

a control lever pivotally mounted to said first valve spool such that said control lever may pivot about a first axis with respect to said first valve spool; and a cam assembly rotationally coupled to said control lever such that said control lever is free to rotate axially about a first longitudinal axis of said control lever;

wherein said cam assembly comprises a cam that is positioned adjacent said first ends of said second and third valve spools, whereby said cam may operatively engage said first ends of said second and third valve spools when said control lever is selectively pivoted about said first axis;

wherein rotation of said control lever about said first longitudinal axis causes a corresponding axial rotation of said first valve spool about a second longitudinal axis of said first valve spool;

wherein said valve body further has:
 a pressure feed port through which pressurized fluid may be introduced into said valve body,
 a reservoir port through which fluid may exit said valve body, and
 a plurality of passages interconnecting said second and third spool chambers with said pressure feed port, said reservoir port and a first said signal port and a second said signal port;

wherein when said control lever is pivoted in a first direction about said first axis, said cam engages said first end of said second valve spool and presses said second valve spool into a first operative position and when said control lever is pivoted in a second direction about said first axis, said cam engages said first end of said third valve spool and presses said third valve spool into a first operative position; and wherein said valve assembly further comprises first hydraulic detent means operatively coupled to said second valve spool for producing a first hydraulic detent that presses said second valve spool towards said cam when said third valve spool is pressed into its said first operative position by said cam, and a second hydraulic detent means operatively coupled to said third valve spool for producing a second hydraulic detent that presses said third valve spool towards said cam when said second valve spool is pressed into its said first operative position by said cam.

29. A motion control valve and lever assembly, comprising:

a valve assembly comprising:
 a valve body having a plurality of signal ports and first, second, and third spool chambers; and
 a first valve spool movably mounted in said first spool chamber, a second valve spool slidably mounted in said second spool chamber, and a third valve spool slidably mounted in said third spool chamber, said first, second, and third valve spools each having a first end and a second opposing end;

a control lever pivotally mounted to said first valve spool such that said control lever may pivot about a first axis with respect to said first valve spool; and a cam assembly rotationally coupled to said control lever such that said control lever is free to rotate axially about a first longitudinal axis of said control lever;

wherein said cam assembly comprises a cam that is positioned adjacent said first ends of said second and third valve spools, whereby said cam may operatively engage said first ends of said second and third valve spools when said control lever is selectively pivoted about said first axis;

wherein rotation of said control lever about said first longitudinal axis causes a corresponding axial rotation of said first valve spool about a second longitudinal axis of said first valve spool;

wherein said valve body further has fourth and fifth spool chambers;

wherein said valve assembly further comprises:
 a fourth valve spool slidably mounted in said fourth spool chamber,
 a fifth valve spool slidably mounted in said fifth spool chamber, and
 a pivot interconnecting said control lever and said first valve spool such that said control lever is pivotable about said first axis and about a second axis with respect to said first valve spool; and wherein said second, third, fourth, and fifth valve spools are positioned about said first valve spool such that said second and third valve spools are on opposite sides of said first valve spool and said fourth and fifth valve spool are opposite sides of said first valve spool.

* * * * *